United States Patent
Bailey et al.

(10) Patent No.: US 7,161,580 B2
(45) Date of Patent: Jan. 9, 2007

(54) HAPTIC FEEDBACK USING ROTARY HARMONIC MOVING MASS

(75) Inventors: David Bailey, Menlo Park, CA (US); Danny Grant, Montreal (CA); Alex Jasso, San Jose, CA (US); Ken Martin, Los Gatos, CA (US); Erik Shahoian, San Ramon, CA (US); Kollin Tierling, Milpitas, CA (US); Steven Vassallo, Redwood City, CA (US)

(73) Assignee: Immersion Corporation, San Jose, CA (US)

(*) Notice: Subject to any disclaimer, the term of this patent is extended or adjusted under 35 U.S.C. 154(b) by 42 days.

(21) Appl. No.: 10/301,809

(22) Filed: Nov. 22, 2002

(65) Prior Publication Data

US 2003/0201975 A1 Oct. 30, 2003

Related U.S. Application Data

(60) Provisional application No. 60/375,930, filed on Apr. 25, 2002.

(51) Int. Cl.
*G09G 5/00* (2006.01)
*A63F 9/24* (2006.01)
*G06F 3/00* (2006.01)

(52) U.S. Cl. .................... 345/156; 463/38; 715/702
(58) Field of Classification Search ............ 463/36–38; 340/311.1; 345/156, 157, 161, 163, 164, 345/173; 310/12–14
See application file for complete search history.

(56) References Cited

U.S. PATENT DOCUMENTS 2,972,140 A   2/1961   Hirsch
3,157,853 A   11/1964  Hirsch
3,220,121 A   11/1965  Cutler
3,497,668 A   2/1970   Hirsch
3,517,446 A   6/1970   Corlyon et al.
3,623,064 A   11/1971  Kagan (Continued)

FOREIGN PATENT DOCUMENTS

| EP | 0 349 086 A1 | 1/1990 |
| GB | 1088741 | 10/1967 |
| JP | H2-185278 | 7/1990 |
| JP | H4-8381 | 1/1992 |
| JP | H5-192449 | 8/1993 |
| JP | H7-24147 | 1/1995 |
| WO | WO9200559 | 1/1992 |
| WO | 92/19018 | 10/1992 |
| WO | WO0103105 A1 | 1/2001 |
| WO | WO0113354 A1 | 2/2001 |
| WO | WO0124158 | 4/2001 |

OTHER PUBLICATIONS

Patent Abstracts of Japan, application No. 59152667, publication No. 61032487, publication date Feb. 15, 1986, applicant Nippon Telegr & Teleph Corp.

International Search Report for international application PCT/US2005/007215, date of mailing Jun. 28, 2005.

Patrick, "Design Construction, and Testing of a Fingertip Tactile Display for Interaction with Virtual and Remote Environments," *Master of Science Thesis*, MIT, Aug. 1990, archived Nov. 8, 1990.

(Continued)

*Primary Examiner*—Sumati Lefkowitz
*Assistant Examiner*—Alecia D. Nelson
(74) *Attorney, Agent, or Firm*—Thelen Reid & Priest LLP; David B. Ritchie

(57) ABSTRACT

A haptic device comprises an actuator and a mass. The actuator has a shaft. The actuator is elastically coupled to the mass and/or a base.

6 Claims, 20 Drawing Sheets

U.S. PATENT DOCUMENTS

| | | | |
|---|---|---|---|
| 3,902,687 A | | 9/1975 | Hightower |
| 3,903,614 A | | 9/1975 | Diamond et al. |
| 3,911,416 A | | 10/1975 | Feder |
| 3,919,691 A | | 11/1975 | Noll |
| 4,127,752 A | | 11/1978 | Lowthorp |
| 4,160,508 A | | 7/1979 | Frosch et al. |
| 4,236,325 A | | 12/1980 | Hall et al. |
| 4,262,549 A | | 4/1981 | Schwellenbach |
| 4,333,070 A | | 6/1982 | Barnes |
| 4,382,166 A | * | 5/1983 | Kim ........................... 200/6 A |
| 4,414,984 A | | 11/1983 | Zarudiansky |
| 4,459,440 A | * | 7/1984 | Wiczer ....................... 200/6 A |
| 4,464,117 A | | 8/1984 | Foerst |
| 4,473,725 A | * | 9/1984 | Kim ........................... 200/6 A |
| 4,484,191 A | | 11/1984 | Vavra |
| 4,513,235 A | | 4/1985 | Acklam et al. |
| 4,581,491 A | | 4/1986 | Boothroyd |
| 4,599,070 A | | 7/1986 | Hladky et al. |
| 4,600,854 A | | 7/1986 | Bednorz et al. |
| 4,706,294 A | | 11/1987 | Ouchida |
| 4,708,656 A | | 11/1987 | de Vries et al. |
| 4,713,007 A | | 12/1987 | Alban |
| 4,731,603 A | | 3/1988 | McRae |
| 4,794,392 A | | 12/1988 | Selinko |
| 4,795,296 A | | 1/1989 | Jau |
| 4,868,549 A | | 9/1989 | Affinito et al. |
| 4,885,565 A | | 12/1989 | Embach |
| 4,891,764 A | | 1/1990 | McIntosh |
| 4,930,770 A | | 6/1990 | Baker |
| 4,934,694 A | | 6/1990 | McIntosh |
| 5,019,761 A | | 5/1991 | Kraft |
| 5,022,384 A | | 6/1991 | Freels |
| 5,022,407 A | | 6/1991 | Horch et al. |
| 5,035,242 A | | 7/1991 | Franklin et al. |
| 5,038,089 A | | 8/1991 | Szakaly |
| 5,078,152 A | | 1/1992 | Bond et al. |
| 5,103,404 A | | 4/1992 | McIntosh |
| 5,107,262 A | | 4/1992 | Cadoz |
| 5,146,566 A | | 9/1992 | Hollis, Jr. |
| 5,165,897 A | | 11/1992 | Johnson |
| 5,172,092 A | | 12/1992 | Nguyen et al. |
| 5,175,459 A | | 12/1992 | Danial et al. |
| 5,184,319 A | | 2/1993 | Kramer |
| 5,186,629 A | | 2/1993 | Rohen |
| 5,186,695 A | | 2/1993 | Mangseth et al. |
| 5,203,563 A | | 4/1993 | Loper, III |
| 5,212,473 A | | 5/1993 | Louis |
| 5,227,594 A | * | 7/1993 | Russo ........................ 200/6 A |
| 5,240,417 A | | 8/1993 | Smithson et al. |
| 5,261,291 A | * | 11/1993 | Schoch et al. ............ 74/484 R |
| 5,271,290 A | | 12/1993 | Fischer |
| 5,275,174 A | | 1/1994 | Cook |
| 5,283,970 A | | 2/1994 | Aigner |
| 5,296,871 A | | 3/1994 | Paley |
| 5,299,810 A | | 4/1994 | Pierce et al. |
| 5,309,140 A | | 5/1994 | Everett, Jr. et al. |
| 5,334,027 A | | 8/1994 | Wherlock |
| 5,354,162 A | | 10/1994 | Burdea |
| 5,388,992 A | | 2/1995 | Franklin |
| 5,399,091 A | | 3/1995 | Mitsumoto |
| 5,405,152 A | | 4/1995 | Katanics |
| 5,436,622 A | | 7/1995 | Gutman et al. |
| 5,437,607 A | | 8/1995 | Taylor |
| 5,440,183 A | | 8/1995 | Denne |
| 5,466,213 A | | 11/1995 | Hogan et al. |
| 5,547,382 A | | 8/1996 | Yamasaki et al. |
| 5,565,840 A | | 10/1996 | Thorner |
| 5,575,761 A | | 11/1996 | Hajianpour |
| 5,580,251 A | | 12/1996 | Gilkes |
| 5,583,478 A | | 12/1996 | Renzi |
| 5,587,937 A | | 12/1996 | Massie |
| 5,589,828 A | * | 12/1996 | Armstrong ................... 341/20 |
| 5,619,180 A | | 4/1997 | Massimino |
| 5,631,861 A | | 5/1997 | Kramer |
| 5,643,087 A | | 7/1997 | Marcus |
| 5,661,446 A | | 8/1997 | Anderson |
| 5,669,818 A | | 9/1997 | Thorner |
| 5,684,722 A | | 11/1997 | Thorner |
| 5,689,285 A | * | 11/1997 | Asher ......................... 345/161 |
| 5,690,582 A | | 11/1997 | Ulrich et al. |
| 5,709,219 A | | 1/1998 | Chen |
| 5,714,978 A | | 2/1998 | Yamanaka |
| 5,734,373 A | | 3/1998 | Rosenberg |
| 5,736,978 A | | 4/1998 | Hasser |
| 5,739,811 A | | 4/1998 | Rosenberg |
| 5,742,278 A | | 4/1998 | Chen |
| 5,754,023 A | | 5/1998 | Roston |
| 5,766,016 A | | 6/1998 | Sinclair et al. |
| 5,781,172 A | | 7/1998 | Engel |
| 5,784,052 A | | 7/1998 | Keyson |
| 5,785,630 A | | 7/1998 | Bobick et al. |
| 5,790,108 A | | 8/1998 | Salcudean |
| 5,805,140 A | | 9/1998 | Rosenberg |
| 5,828,363 A | * | 10/1998 | Yaniger et al. ............. 345/156 |
| 5,857,986 A | | 1/1999 | Moriyasu |
| 5,889,672 A | | 3/1999 | Schuler |
| 5,894,263 A | | 4/1999 | Shimakawa |
| 5,897,437 A | | 4/1999 | Nishiumi |
| 5,914,705 A | * | 6/1999 | Johnson et al. ............. 345/163 |
| 5,945,772 A | | 8/1999 | Macnak |
| 5,973,670 A | | 10/1999 | Barber |
| 5,984,880 A | | 11/1999 | Lander |
| 5,986,643 A | | 11/1999 | Harvill |
| 6,001,014 A | | 12/1999 | Ogata |
| 6,004,134 A | | 12/1999 | Marcus |
| 6,044,646 A | | 4/2000 | Silverbrook |
| 6,046,726 A | * | 4/2000 | Keyson ....................... 345/156 |
| 6,078,126 A | | 6/2000 | Rollins |
| 6,088,017 A | | 7/2000 | Tremblay |
| 6,088,019 A | | 7/2000 | Rosenberg |
| 6,104,158 A | | 8/2000 | Jacobus |
| 6,111,577 A | | 8/2000 | Zilles et al. |
| 6,160,489 A | | 12/2000 | Perry et al. |
| 6,181,318 B1 | * | 1/2001 | Lim ............................ 345/698 |
| 6,184,868 B1 | | 2/2001 | Shahoian |
| 6,198,206 B1 | | 3/2001 | Saarmaa |
| 6,211,861 B1 | | 4/2001 | Rosenberg |
| 6,275,213 B1 | | 8/2001 | Tremblay |
| 6,317,032 B1 | | 11/2001 | Oishi |
| 6,422,941 B1 | | 7/2002 | Thorner et al. |
| 6,424,333 B1 | | 7/2002 | Tremblay |
| 6,433,771 B1 | * | 8/2002 | Yocum et al. .............. 345/156 |
| 6,585,595 B1 | | 7/2003 | Soma |
| 2001/0026264 A1 | * | 10/2001 | Rosenberg .................. 345/156 |
| 2002/0030663 A1 | | 3/2002 | Tierling |
| 2002/0070638 A1 | | 6/2002 | Perkins et al. |
| 2002/0142701 A1 | * | 10/2002 | Rosenberg .................. 446/454 |

OTHER PUBLICATIONS

Calder, "Design of A Force–Feedback Touch–Introducing Actuator For Teleoperator Robot Control," *Bachelor of Science Thesis,* MIT, May 1983, archived Jun. 23, 1983.

Wiker, "Teletouch Display Development: Phase 1 Report," *Technical Report 1230,* Naval Ocean Systems Center, San Diego, Jul. 1988.

Bliss, "Optical–to–Tactile Image Conversion for the Blind," *IEEE Transactions on Man–Machine Systems,* vol. MMS–11, No. 1, Mar. 1970.

Johnson, "Shape–Memory Alloy Tactile Feedback Actuator," *Armstrong Aerospace Medical Research Laboratory*, AAMRL–TR–90–039, Aug. 1990.

Kontarinis et al., "Tactile Display of Vibratory Information in Teleoperation and Virtual Environments," PRESENCE, 4(4):387–402, Harvard Univ., 1995.

Aukstakalnis et al., "Silicon Mirage: The Art and Science of Virtual Reality," ISBN 0–938151–82–7, pp. 129–180, 1992.

Eberhardt et al., "Inducing Dynamic Haptic Perception by The Hand: System Description and Some Results," DSC–vol. 55–1, *Dynamic Systems and Control:* vol. 1, ASME 1994.

Gobel et al., "Tactile Feedback Applied to Computer Mice," *International Journal of Human–Computer Interaction*, vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low–Cost Force Feedback Joystick and Its Use in the Virtual Reality Environment," *Proceedings of the Third Pacific Conference on Computer Graphics and Applications, Pacific Graphics '95*, Seoul, Korea, Aug. 21–24, 1995.

Kaczmarek et al., "Tactile Displays," *Virtual Environment Technologies*, Chap. 9, pp. 349–414.

Lake, "Cyberman from Logitech," at http://www.ibiblio.org/GameBytes/issue21/greviews/cyberman.html, 1994.

Component Maintenance Manual With Illustrated Parts List, Coaxial Control Shaker Part No. C–25502, Safe Flight Instrument Corporation, Revised Jan. 28, 2002 (3 pages).

"Technical Manual Overhaul Instructions With Parts Breakdown, Coaxial Control Shaker Part No. C–25502," Safe Flight Instrument Corporation, Revised Jul. 15, 1980 (23 pages).

Baigrie, "Electric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., "Design and Implementation of a Force Reflecting Manipulandum for Manual Control research," DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Stimulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 28, No. 4450, pp. 1327–1335, 1980.

Bejczy et al., "Generalization of Bilateral Force–Reflecting Control of Manipulator," *Proceedings Of Fourth CISM–IFToMM*, Sep. 8–12, 1981.

McAffee et al., "Teleoperator Subsystem/Telerobot Demonstrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Reflecting Teleoperated Hand System for the Study of Tactile Sensing in Precision Manipulation," *Proceedings of the 1992 IEEE International Conference on Robotics and Automation,* Nice, France, May 1992.

Eberhardt et al., "OMAR—A Haptic display for speech perception by deaf and deaf–blind individuals," *IEEE Virtual Reality Annual International Symposium,* Seattle, WA, Sep. 18–22, 1993.

Rabinowitz et al., "Multidimensional tactile displays: Identification of vibratory intensity, frequency, and contractor area," *Journal of The Acoustical Society of America,* vol. 82, No. 4, Oct. 1987.

Bejczy et al., "Kinesthetic Coupling Between Operator and Remote Manipulator," *International Computer Technology Conference, The American Society of Mechanical Engineers,* San Francisco, CA, Aug. 12–15, 1980.

Bejczy et al., "A Laboratory Breadboard System For Dual–Arm Teleoperation," *SOAR '89 Workshop, JSC,* Houston, TX, Jul. 25–27, 1989.

Ouhyoung et al., "A Low–Cost Force Feedback Joystick and Its Use in PC Video Games," *IEEE Transactions on Consumer Electronics,* vol. 41, No. 3, Aug. 1995.

Marcus, "Touch Feedback in Surgery," *Proceedings of Virtual Reality and Medicine The Cutting Edge,* Sep. 8–11, 1994.

Bejczy, et al., "Universal Computer Control System (UCCS) For Space Telerobots," CH2413–3/87/0000/0318501.00 1987 IEEE, 1987.

* cited by examiner

HAPTIC FEEDBACK USING ROTARY HARMONIC MOVING MASS

CROSS-REFERENCE TO RELATED APPLICATIONS

This application claims priority to co-pending U.S. patent application No. 60/375,930, entitled "Haptic Feedback Using Rotary Harmonic Moving Mass," filed on Apr. 25, 2002, the entirety of which is incorporated herein by reference.

BACKGROUND

The present invention relates generally to haptic feedback devices, and more particularly to vibrations and similar force sensations produced from a haptic feedback device.

An interface device can be used by a user to provide information to a computer device or an electronic device. For example, with a computer device, a user can interact with an environment displayed by the computer to perform functions and tasks on the computer, such as playing a game, experiencing a simulation or virtual reality environment, using a computer aided design system, operating a graphical user interface (GUI), or other affecting processes or images depicted on an output device of the computer. In addition, a user can interact with the electronic device, for example, using a remote control, a wireless phone, or stereo controls. Common human interface devices for such computer devices or electronic devices include, for example, a joystick, button, mouse, trackball, knob, steering wheel, stylus, tablet, and pressure-sensitive ball.

In some interface devices, force feedback or tactile feedback is also provided to the user, also known more generally herein as "haptic feedback." These types of interface devices can provide physical sensations that are felt by the user using the controller or manipulating a physical object of the interface device. Each of these interface devices includes one or more actuators, which are connected to a controlling processor and/or computer system. Consequently, a controlling processor and/or computer system can control haptic forces produced by the haptic feedback device in coordination with actions of the user and/or events associated with a graphical or displayed environment by sending control signals or commands to the actuator(s) of the haptic feedback device.

Many low cost haptic feedback devices produce haptic forces, for example, by vibrating the manipulandum and/or the housing of the haptic feedback devices while being held by users. One or more haptic devices can be activated to provide the vibration forces. This can be accomplished, for example, by rotating an eccentric mass coupled to the shaft of each haptic device. As a result, the housing also vibrates. Two different haptic devices can be used: one haptic device having a larger mass provides low frequency rumbles and another haptic device having a smaller mass provides higher frequency vibrations.

These known haptic feedback devices, however, suffer several shortcomings. First, single-actuator systems having a relatively large rotating mass are effective at providing rough, high magnitude sensations, but are ineffective at providing subtle, high frequency vibrations, thereby severely limiting the variety of haptic feedback effects that can be experienced by a user of these haptic feedback devices. One attempted solution to this problem has been the use of a second haptic device with a smaller rotating mass. Even this attempted solution, however, is costly and uses a relatively large amount of space.

Finally, starting and stopping the rotation of the eccentric mass connected to the actuator involves time delays. These time delays, which can be as long as about 0.1 second, present a challenge in synchronizing the produced haptic forces with the events, actions or interactions in a computer simulation, game, device, etc. In addition, the delays in starting or stopping the rotation of the eccentric mass are not necessarily constant thereby presenting additional synchronization challenges.

Thus, a need exists for improved haptic feedback devices.

SUMMARY OF THE INVENTION

A haptic device comprises an actuator and a mass. The actuator has a shaft. The actuator is elastically coupled to the mass and/or a base.

DETAILED DESCRIPTION

Figure 1:
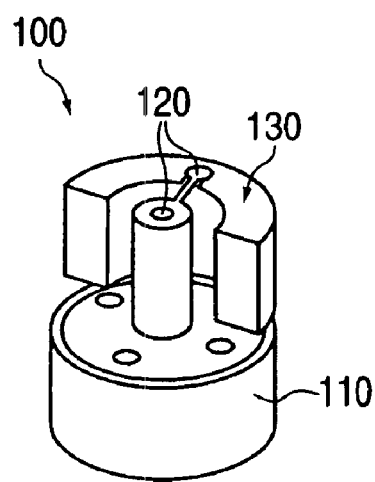
FIGS. 1 and 2 depict a perspective view and a top view, respectively, of a haptic device, according to an embodiment of the invention.

Generally speaking, embodiments described herein relate to haptic devices each of which produces a haptic feedback force through a harmonic spring/mass system. Such a system can include one or more moving masses combined with one or more spring components. The use of the term "spring/mass system" is in reference to any type of system having an elastically or flexibly coupled mass. Such an elastic or flexible coupling can be via, for example, a spring or flexible member. Thus, any references herein to an elastic member or elastic coupling can also apply to a flexible member or flexible coupling.

These haptic devices can be coupled (e.g., by mechanical mounting) to or within a housing to provide haptic feedback force to the user of the housing. The housing can be, for example, for a game controller, a communication device, a remote control, a stereo controller, or a human interface device for computer devices or electronic devices such as a joystick, button, mouse, trackball, knob, steering wheel, stylus, tablet or pressure-sensitive ball.

In many embodiments, a haptic device comprises an actuator and a mass. The actuator has a shaft. The actuator is elastically coupled to the mass and/or a base. In one embodiment, the actuator is a rotary actuator, the mass is an eccentric mass and the shaft of the rotary actuator is elastically coupled to the eccentric mass by an elastic member. In this embodiment, the rotary actuator, the eccentric mass and elastic member of the haptic device collectively have a first operational mode associated with a range of frequencies and a second operational mode associated with a range of frequencies different from the range of frequencies associated with the first operational mode. For example, the first operational mode can be based on a unidirectional rotation of the mass about the shaft of the rotary actuator; the second operational mode can be based on a harmonic motion of the mass.

Embodiments of the haptic devices described herein address many of the shortcomings of known haptic devices described above in the background section. For example, the haptic device embodiments described herein allow independent control of the vibration magnitude and frequency over an extended range of frequencies. In addition, a single actuator can produce both low frequency vibrations, for example using the operational mode based on unidirectional rotation of the mass, and high frequency vibrations, for example using the operational mode based on the harmonic motion of the mass. The actuator can operate in either operational mode singularly or in both operational modes at overlapping times to produce a superposition of low frequency vibrations and high frequency vibrations. Also, the time delays associated with starting and stopping vibrations can be smaller than that of known haptic devices.

The term "operational mode" is used herein to mean a manner of operation of an actuator. Such an operational mode can be described, for example, in reference to the signal applied to the actuator. For example, one operational mode of the actuator can relate to direct current (DC) signals applied to the actuator. In this operational mode (also referred to herein as a "unidirectional mode"), the operation of the actuator results in centripetal acceleration of the mass coupled to the actuator within a range of frequencies associated with the unidirectional mode. Another operational mode of the actuator, for example, can relate to alternating current (AC) signals (e.g., signals with reversing polarity) applied to the actuator. In this operational mode (also referred to herein as a "harmonic mode"), the actuator drives the mass alternatively in opposite directions within a range of frequencies associated with the harmonic mode. In an alternative embodiment, the harmonic mode can be accomplished by providing the actuator with a unidirectional voltage at the harmonic frequency. Following this example, it is possible that a single signal provided to the actuator can result in both the unidirectional mode and the harmonic mode, for example, where frequencies associated with the harmonic mode overlap with the frequencies associated with the unidirectional mode.

Note that the range of frequencies associated with the unidirectional mode is typically different from the range of frequencies associated with the harmonic mode. These ranges of frequencies can be, for example, mutually exclusive or, alternatively, one range can be a subset of the other. For example, the range of frequencies associated with the unidirectional mode can be 10–40 Hz and the range of frequencies associated with the harmonic mode can be 5–250 Hz. In this example, the range of frequencies associated with the unidirectional mode is a subset of the range of frequencies associated with the harmonic mode. Said another way, the vibration frequencies potentially produced while the actuator is operating in the unidirectional mode are a subset of the vibration frequencies potentially produced while the actuator is operating in the harmonic mode. In other embodiments, the range of frequencies associated with the unidirectional mode is mutually exclusive from the range of frequencies associated with the harmonic mode. In yet other embodiments, the range of frequencies associated with the unidirectional mode partially overlaps with the range of frequencies associated with the harmonic mode.

Another operational mode of the actuator can relate to a superposition of the unidirectional mode and the harmonic mode. In this operational mode (also referred to herein as the "superposition mode"), the actuator can be simultaneously driven by DC signals and AC signals, thereby resulting in centripetal acceleration of the mass coupled to the actuator within the range of frequencies associated with the unidirectional mode while also driving the mass in opposite directions within the range of frequencies associated with the harmonic mode. Following the example of above, an actuator operating in the superposition mode can result simultaneously in a vibration frequency between 10 and 40 Hz and one or more vibration frequencies between 5 and 250 Hz. The ranges described herein are for illustrative purposes; any range practicable can be used by embodiments described herein.

In some embodiments, more than the unidirectional mode, harmonic mode and the superposition mode are possible. Such embodiments can have, for example, more than one structure associated with a harmonic mode. For example, a first mass can be elastically coupled to a rotary actuator and a second mass can be elastically coupled to the first mass. In such an embodiment, one harmonic mode can be associated with the elastic coupling between the actuator and the first mass, and a different harmonic mode can be associated with the elastic coupling between the first mass and the second mass. In another example, two masses can be elastically coupled to the shaft of a rotary actuator with two different spring constants. Consequently, superposition of two or more modes, a unidirectional mode, a first harmonic mode and a second harmonic mode, is possible. Embodiments having any number of harmonic modes are also possible.

Although many of the embodiments described herein relate to a rotary actuator coupled to a mass rotating about the shaft of the actuator, non-rotary embodiments are possible. For example, one embodiment comprises a spring that expands and contracts along an axis where the spring is coupled at one end to a mass and coupled at the other end to a shaft of an actuator; the shaft translates along the axis. In other embodiments, the actuator is a pancake motor or a motor with a hollow core. In general, the actuator can be any type of mechanism that generates torque.

Moreover, although many embodiments described herein relate to rotary systems where the rotation is within a plane transverse to the actuator shaft, alternative embodiments are possible where the rotation is not within a plane. For example, an elastic member coupling the mass to the actuator can have elasticity in a direction other than or in addition to the rotation direction. In such embodiments, the harmonic mode can involve non-planar movement of the mass.

The term "actuator" as used herein refers to a motion actuator that causes motion. For example, such an actuator can be, for example, a motor, a piezoelectric structure and a voice coil. This is distinguished from a haptic-force actuator that causes haptic force. For clarity, such a haptic-force actuator is referred to herein as a haptic device. Thus, an actuator (a motion actuator) can be included within a actuator device (a haptic-force actuator).

The term "elastic member" is used herein to mean any type of structure made of a material that tends to return to an initial form or state after deformation. Such an elastic member can be, for example, a plastic or rubber structure, or a metal structure such as a leaf spring or helical spring. The elastic member is elastic in the sense that it has an appropriate elasticity such that a harmonic mode is possible. For example, for embodiments where the actuator is a rotary actuator with an elastically coupled eccentric mass, the elasticity of the elastic coupling is sufficient to allow the mass to move in a harmonic mode either in superposition with the unidirectional mode or without superposition of the unidirectional mode.

The term "haptic" is used herein to relate to the sense of touch, also referred to as tactile. Thus, a haptic device is a device that transfers forces to a user, for example, under the direction of a computer or electronic device thereby allowing the user to interact or interface with the computer or electronic device in a physically tactile way. Although different names can be used to convey the many subtle differences in how these haptic devices operate, they all fall within the term "haptic". Such different names include tactile feedback, full force feedback, vibro-tactile, rumble feedback, touch-enabled, touch-activated and refer to different ways in which haptic devices can operate. For example, rumble feedback typically refers to low-fidelity shakes or rumbles popular with game controllers and used in conjunction with high-action events in a game.

Figure 2:
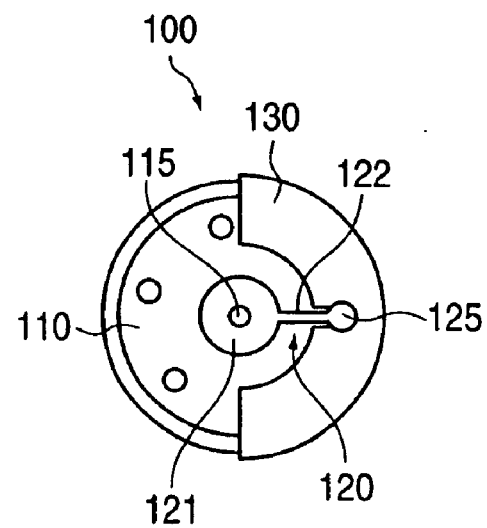

FIGS. 1 and 2 depict a perspective view and a top view, respectively, of a haptic device, according to an embodiment of the invention. As shown in FIGS. 1 and 2, haptic device 100 includes an actuator 110, an elastic member 120 and a mass 130. Actuator 110, which is a rotary actuator, includes a shaft 115. Elastic member 120 includes a proximate portion 121, a compliant portion 122 and a distal portion 125. The proximate portion 121 of elastic member 120 is coupled to the shaft 115 of actuator 110. The distal portion 125, which has a width greater than the compliant portion 122, is coupled to mass 130.

Actuator 110 can be any type of rotary actuator such as, for example, a direct current (DC) motor, voice coil actuator or a moving magnet actuator. In addition, actuator 110 can be disposed in and mechanically grounded to a device housing (not shown), such as in a game controller housing. Examples of haptic devices disposed in and mechanically grounded to game controller housings are disclosed in application Ser. Nos. 09/967,494 and 09/967,496, the disclosure of which are both incorporated herein by reference.

Although elastic member 120 is shown as being integrally formed in a unitary construction among the proximate portion 121, compliant portion 122 and distal portion 125, other configurations are possible. Where the compliant portion is made of a flexible material, the proximate portion and the distal portion need not be made of flexible materials and need not be integrally formed with the compliant portion. For example, the compliant portion of an elastic member can be coupled to the mass and/or the shaft of the actuator by separate couplings or fasteners. Similarly, the elastic member can be of various types including, for example, leaf springs or helical springs.

Actuator 110, elastic member 120 and mass 130 of haptic device 100 collectively have a first operational mode associated with a range of frequencies and a second operational mode associated with a range of frequencies different from the range of frequencies associated with the first mode. For example, the first mode can be based on a unidirectional rotation of mass 100 about shaft 115 of the actuator 110 (also referred to herein as the "unidirectional mode"); the second mode can be based on a harmonic motion of the mass (also referred to herein as the "harmonic mode").

More specifically, elastic member 120 coupled between shaft 115 of actuator 110 and mass 130 results in a harmonic system. In a harmonic system, the electrical driving signal and resulting motor torque act against a conservative mechanical system. Such a harmonic system exhibits second order behavior with the magnification of vibrations at certain frequencies (e.g., at a resonance frequency of the mechanical system). Here, haptic device 100 is configured as a harmonic system where elastic member 120 stores energy and releases it while in the harmonic mode. Said another way, the compliant portion 122 of elastic member 120 stores energy during the movement of mass 130 in response to one polarity of the AC drive signal and releases the energy during the movement of mass 130 in response to the other polarity of the AC drive signal. This results in harmonic motion and corresponding amplification through broad resonance. This results in high magnitude vibrations and other effects in a power-efficient manner. In addition, complex AC drive signals having many different frequency components can be superimposed on each other while haptic device 100 operates in the harmonic mode.

The inventors have recognized that it is advantageous for the damping factor of the mechanical system to be low. This may result in a more efficient harmonic vibration.

Consequently, the compliant portion 122 of the elastic member 120 can be made of polypropylene, which exhibits a low damping. Alternatively, the elastic member can be made of steel, wire, plastic or other similar types of materials that can connect the mass 130 in series with the shaft 115 of the actuator 110.

When operating in the unidirectional mode, actuator 110 can be driven, for example, with a DC current, thereby causing mass 130 to rotate about the shaft 115 of actuator 110 with centripetal acceleration. This centripetal acceleration provides strong inertial forces against the device housing. Firmware techniques can be used to control the magnitude of the vibrations while operating in the unidirectional mode. For example, a certain pulse-repetition rate having a 50% duty cycle results in mass 130 rotating unidirectionally at a certain rate with half of the vibration magnitude that would otherwise result from applying a constant voltage (i.e., 100% duty cycle). Further examples of such firmware are disclosed in application Ser. No. 09/669,029, the disclosure of which is incorporated herein by reference.

When actuator 110 is operated in the harmonic mode, mass 130 oscillates at or approximately at the frequency of the drive signal (e.g., an AC signal driving actuator 110). Such a drive signal can be produced, for example, by an H-bridge circuit or other amplifier. This advantageously involves smaller time delays in starting and stopping movement of the mass than is the case with motion of the mass in the unidirectional mode.

Figure 3:
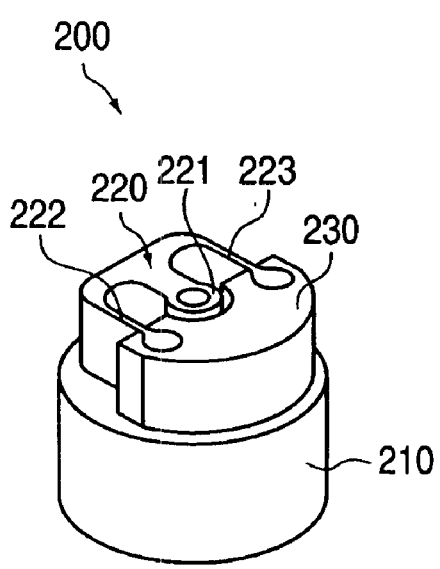
FIGS. 3 and 4 depict a perspective view and a top view, respectively, of a haptic device having two compliant portions, according to an embodiment of the invention.
Figure 4:
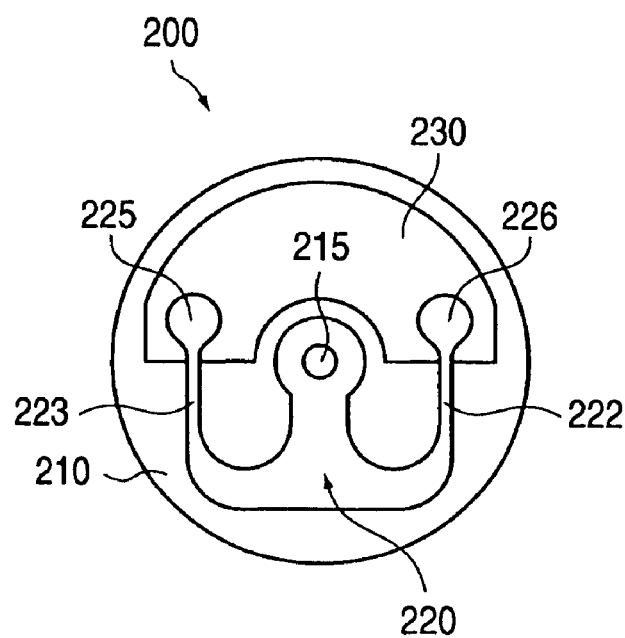

Although FIGS. 1 and 2 show an elastic member having a single compliant portion, alternative embodiments of an elastic member having multiple compliant portions are possible. For example, FIGS. 3 and 4 depict a perspective view and a top view, respectively, of a haptic device having two compliant portions, according to an embodiment of the invention. As shown in FIGS. 3 and 4, haptic device 200 includes an actuator 210, an elastic member 220 and a mass 230. Actuator 210, which is a rotary actuator, includes a shaft 215. Elastic member 220 includes a proximate portion 221, compliant portions 222 and 223, and distal portions 225 and 226. The proximate portion 221 of elastic member 220 is coupled to the shaft 215 of actuator 210. The distal portions 225 and 226, each of which have a width greater than the compliant portions 222 and 223, are coupled to mass 230. Although elastic member 220 shown in FIGS. 3 and 4 has two compliant portions 222 and 223, other embodiments are possible where the elastic member has greater than two compliant portions.

Note that the compliant portion(s) can be compliant in one degree of freedom or axis of travel of mass, but need not be compliant in the remaining degrees of freedom. For example, compliant portion 122 (shown in FIGS. 1 and 2) can be inflexible in the direction parallel to the axis of rotation along shaft 115 of actuator 110. Similarly, compliant portions 222 and 223 can each be inflexible in the direction parallel to the axis of rotation along shaft 215 of actuator 210. As best shown in FIG. 3, compliant portions 222 and 223 can be relatively thick along the direction parallel to shaft 215 of actuator 210.

In another embodiment, a haptic device includes a variable-stiffness mechanical actuator. If the spring constant (K) value of a compliant portion of an elastic member can be varied as a function of drive frequency, then the haptic device can operate near a peak magnification and efficiency. A variable-stiffness mechanical actuator can be, for example, a piezoelectric structure (e.g., a piezoelectric buzzer). Such a piezoelectric structure can include, for example, a ceramic on a mass where an applied voltage causes movement of the ceramic. Through the proper selection of the applied voltage, the ceramic can behave in a manner similar to a spring. The piezoelectric structure can change its spring constant as a function of bias voltage. Consequently, a frequency-to-voltage converter driving the piezo structure element can maintain a resonance frequency of the haptic device by adjusting the spring constant.

The particular behavior of a given embodiment of the haptic device having a unidirectional mode and a harmonic mode (e.g., haptic device 100 shown in FIGS. 1 and 2, and haptic device 200 shown in FIGS. 3 and 4) can be modeled. Such a model can be based on various factors such as, for example, the mass shape and weight distribution, and the stiffness of the compliant portion of the elastic member. The following provides a dynamics model of an embodiment of the haptic device having a unidirectional mode and a harmonic mode.

The following equation is based on a second order Laplace transfer function and can be used to model the harmonic mode of a haptic device:

$$X/Tm = 1/(r(ms^2 + bs + k))$$

where X is displacement, Tm is the torque of the motor, m is the weight of the mass, r is the eccentricity radius, k is the spring constant, b is the damping constant, and s is the Laplace variable. To be more specific, the eccentricity radius, r, is the distance from center of actuator shaft to center of mass of the mass.

The following equation can be used to model the unidirectional mode of a haptic device:

$$F = r\omega^2 m$$

where F is the force, $\omega$ is the angular velocity ($2\pi f$), f is the frequency of the actuator.

The above defined dynamics model can be used to design a haptic device having a harmonic mode. For example, the specific values of the damping ratio, the spring constant, the weight of the mass and the eccentricity radius can be selected to obtain a particular behavior of the haptic device. FIGS. 5 through 12 depict position and acceleration bode plots for a haptic device operating in the harmonic mode as a function of a particular variable. The position bode plots show the amplitude displacement of the mass from an origin position for different drive signal frequencies. The acceleration bode plots show the acceleration force of the mass for different drive signal frequencies. With respect to FIGS. 5 and 6, the damping ratio, d, is related to the damping constant, b, by the equation: b/(2*sqrt(k)). Note that the y-axis units have been scaled for a motor capable of outputting 0.003 Nm of torque. The nominal comparison case is m=20 grams, damping ratio=0.15, k=1000 N/m, r=10 mm, mp=250 grams. This nominal case results in a displacement of +/−1 mm with an acceleration of a mass in a linear actuator assembly of +/−5 g, which equates to approximately 0.4 g to a 250-gram game controller.

Figure 5:
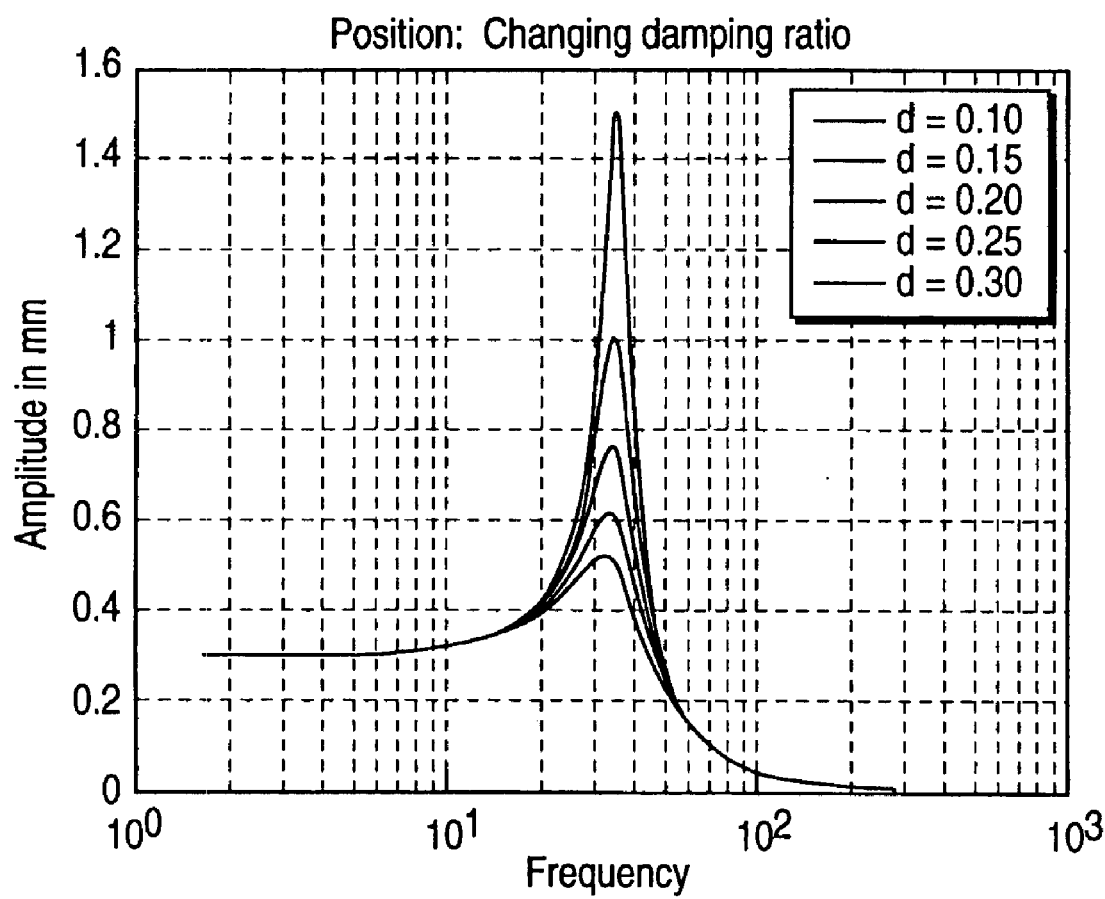
FIGS. 5 and 6 show a position bode plot and an acceleration bode plot, respectively, as a function of the damping ratio for a haptic device operating in a harmonic mode, according to embodiments of the invention.
Figure 6:
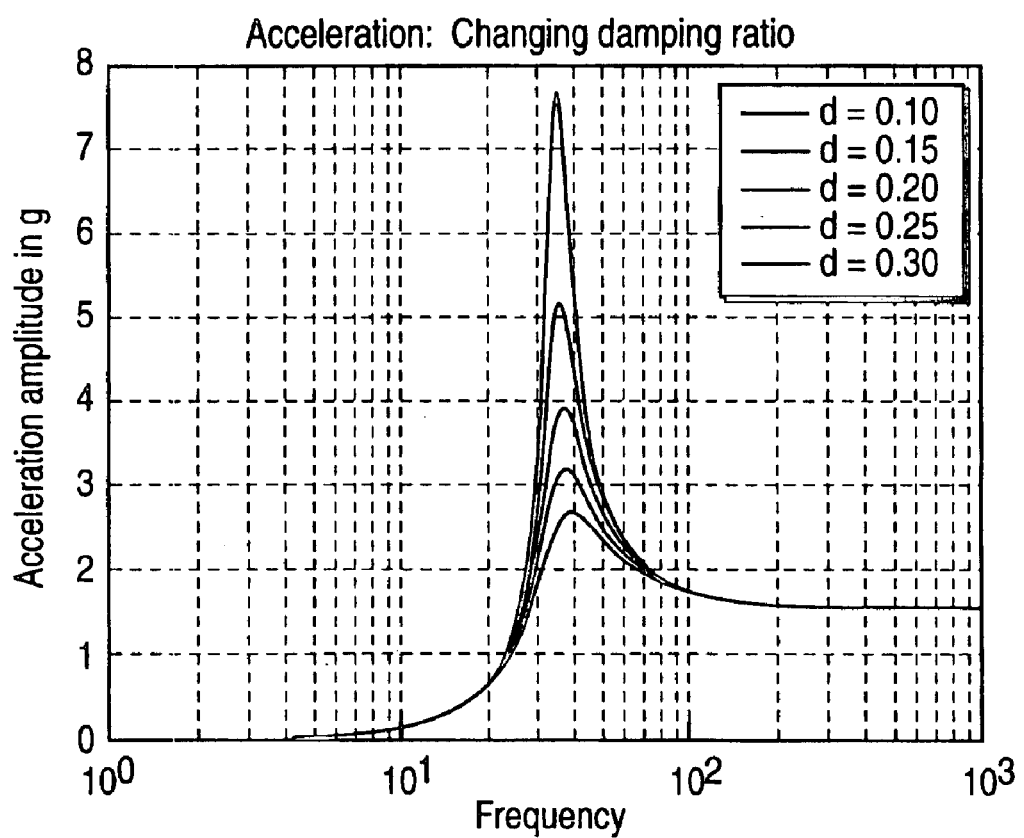

FIGS. 5 and 6 show a position bode plot and an acceleration bode plot, respectively, as a function of the damping ratio for a haptic device operating in a harmonic mode, according to embodiments of the invention. As FIGS. 5 and 6 show, reducing the damping ratio results in a greater position displacement and acceleration of the mass. Thus, for some embodiments, it may be desirable to reduce the damping ratio below 0.15.

Figure 7:
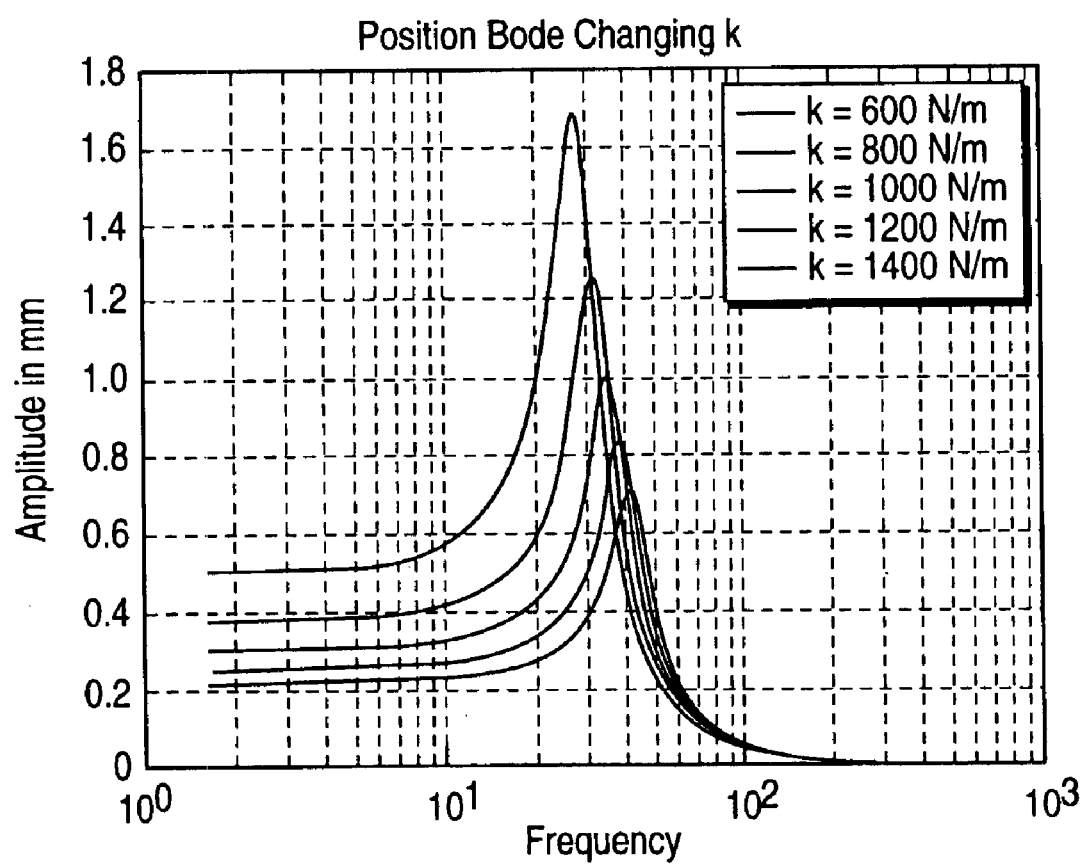
FIGS. 7 and 8 show a position bode plot and an acceleration bode plot, respectively, as a function of the spring constant for a haptic device operating in a harmonic mode, according to embodiments of the invention.
Figure 8:
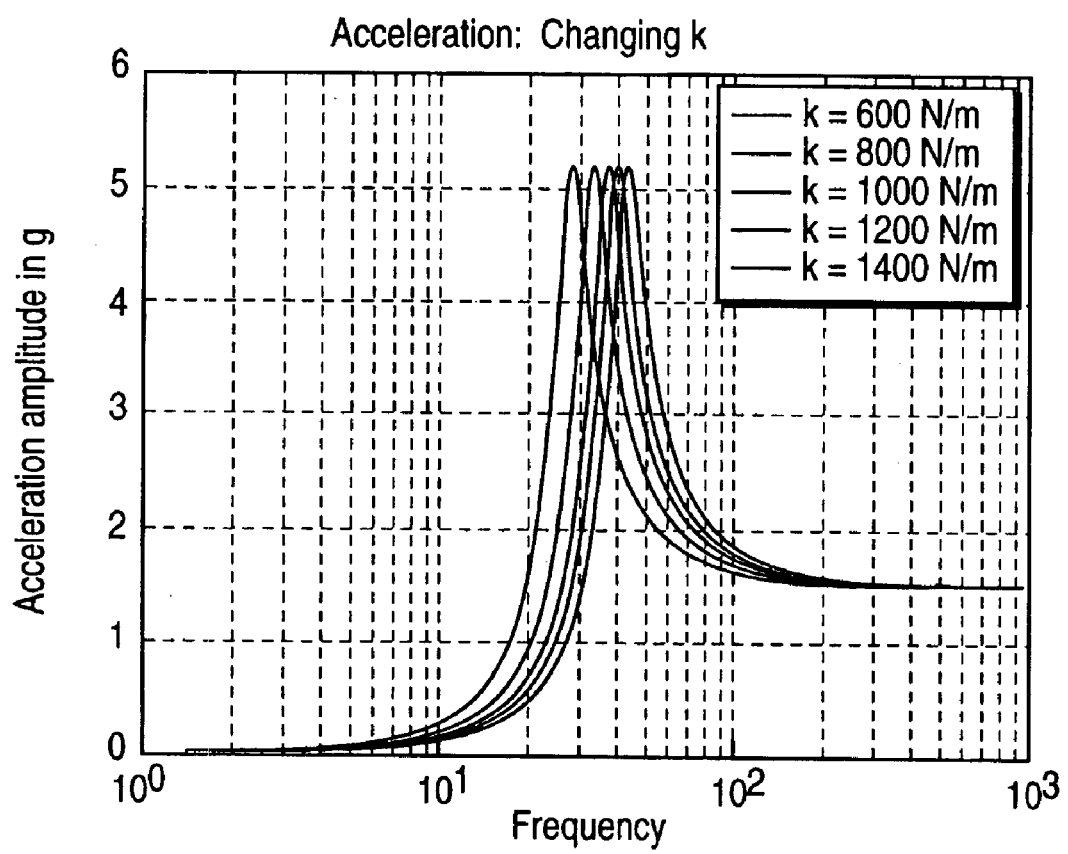

FIGS. 7 and 8 show a position bode plot and an acceleration bode plot, respectively, as a function of the spring constant for a haptic device operating in a harmonic mode, according to embodiments of the invention. As FIGS. 7 and 8 show, the resonance frequency of the resonance mode of the haptic device is a function of the spring constant. More specifically, the peak-to-peak distance along the x-axis of the position displacement of the mass shown in FIG. 7 changes as a function of frequency, while the peak-to-peak distance along the x-axis of the acceleration of the mass shown in FIG. 8 does not change significantly as a function of frequency. Consequently, a haptic device having a harmonic mode can be designed for a specific resonance frequency by selecting a particular value for the spring constant.

Figure 9:
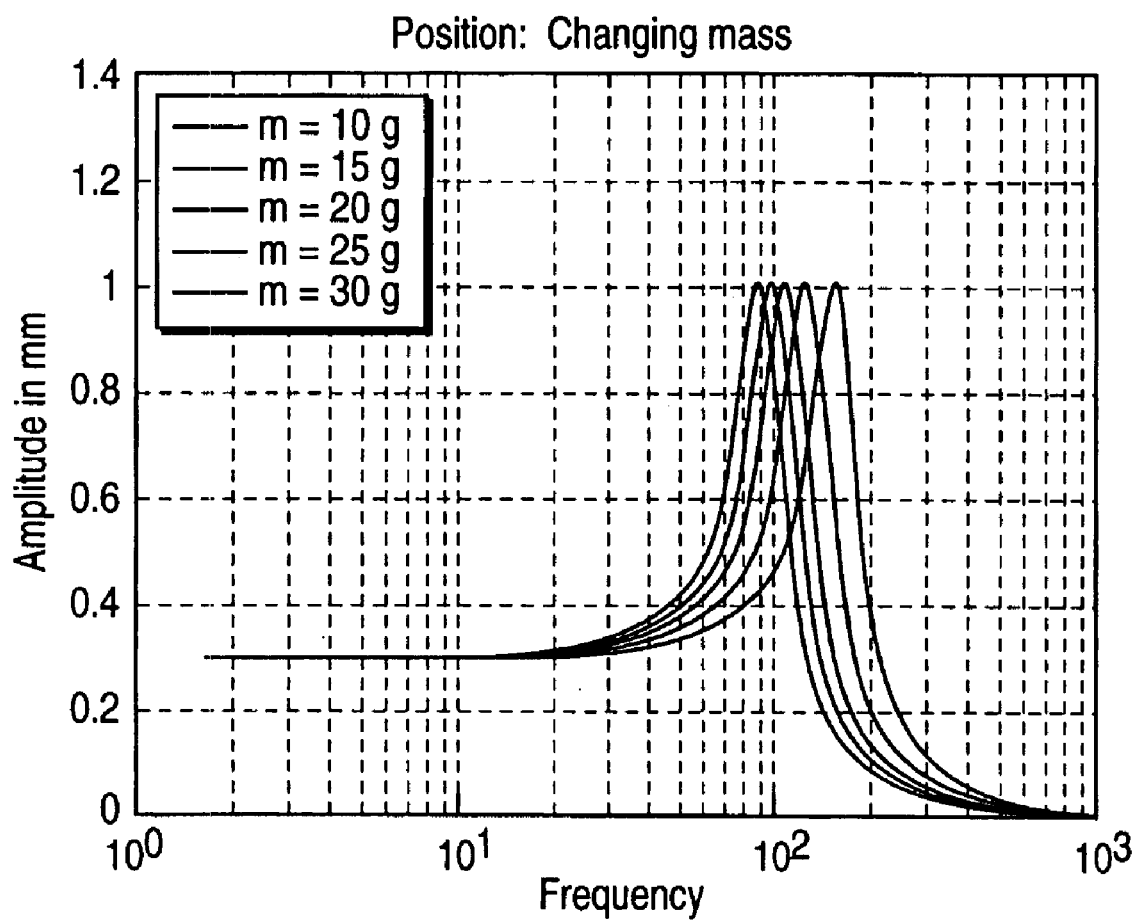
FIGS. 9 and 10 show a position bode plot and an acceleration bode plot, respectively, as a function of the mass for a haptic device operating in a harmonic mode, according to embodiments of the invention.
Figure 10:
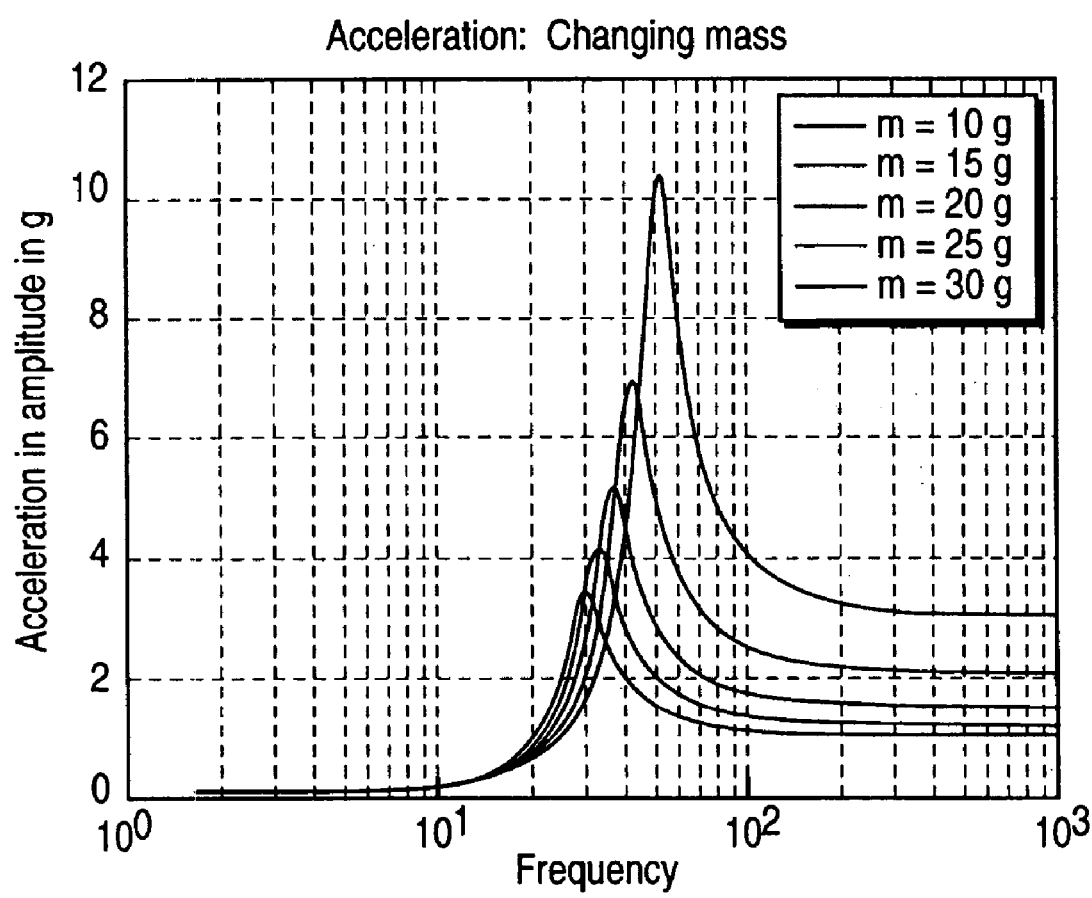

FIGS. 9 and 10 show a position bode plot and an acceleration bode plot, respectively, as a function of the mass for a haptic device operating in a harmonic mode, according to embodiments of the invention. As FIGS. 9 and 10 show, the resonance frequency and, in particular, the peak acceleration of the mass is a function of the weight of the mass. As best shown in FIG. 10, the amplitude of the acceleration of the mass increases with a decrease in the weight of the mass.

Figure 11:
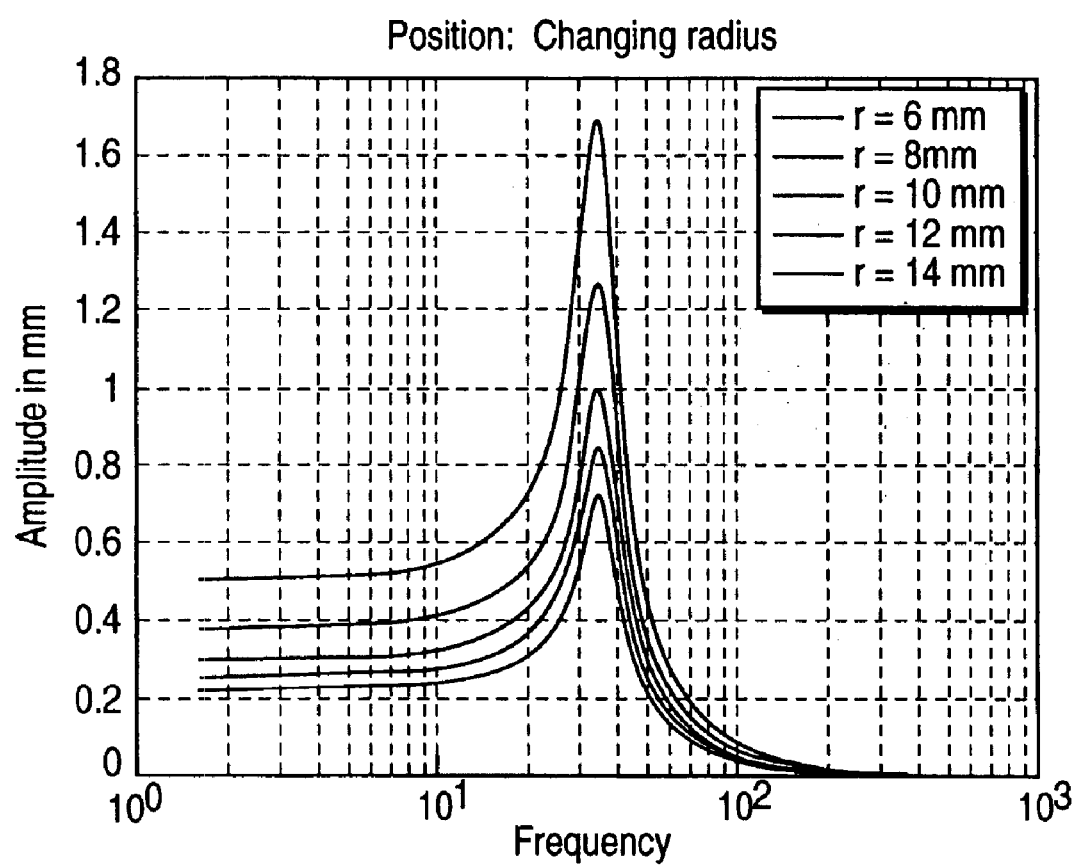
FIGS. 11 and 12 show a position bode plot and an acceleration bode plot, respectively, as a function of the eccentric radius for a haptic device operating in a harmonic mode, according to embodiments of the invention.
Figure 12:
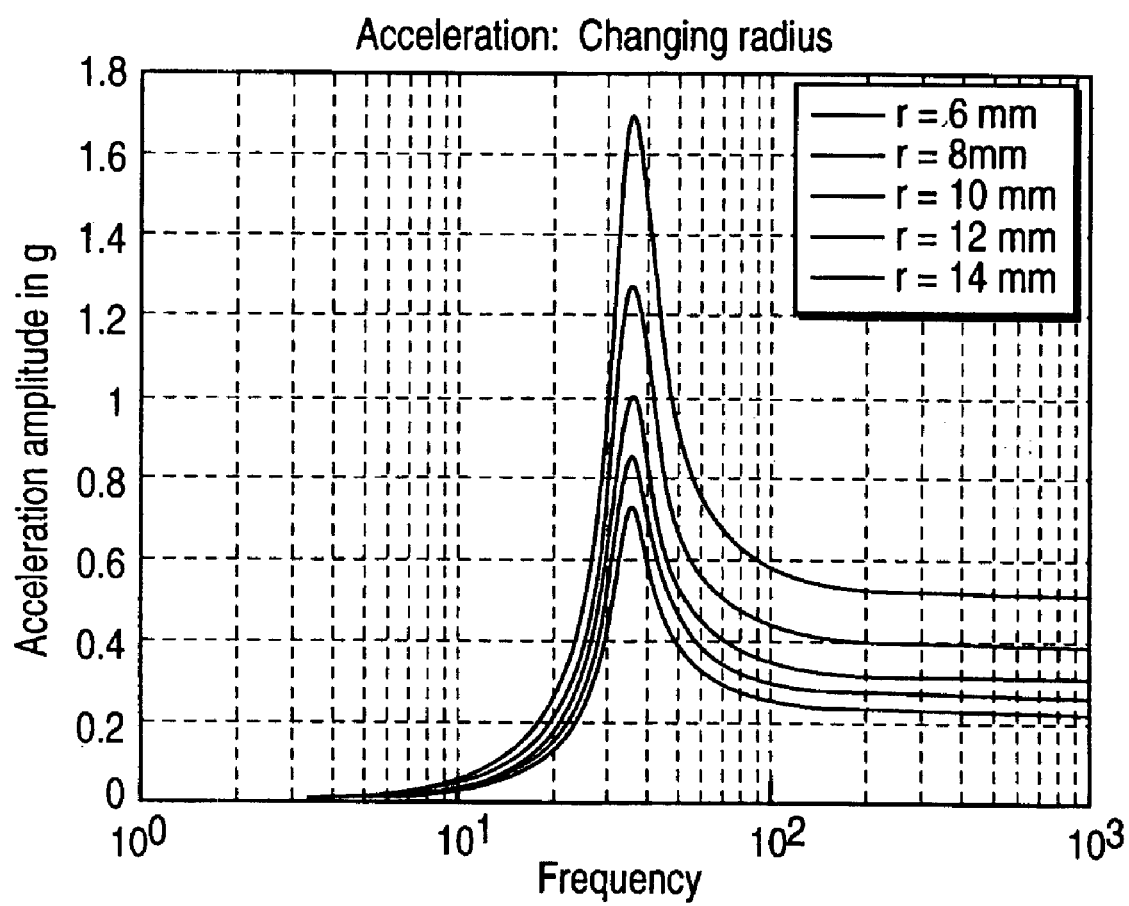

FIGS. 11 and 12 show a position bode plot and an acceleration bode plot, respectively, as a function of the eccentric radius for a haptic device operating in a harmonic mode, according to embodiments of the invention. As FIGS. 11 and 12 show, the acceleration of the mass is a function of the eccentricity radius. Consequently, a lower eccentricity radius results in an increased displacement and acceleration of the mass while the harmonic device is operating in the harmonic mode. In other words, a shorter distance between the actuator shaft and the center of mass of the mass results in the actuator exerting greater force on the mass. Such a shorter eccentricity radius, however, can also result in a lower acceleration of the mass while the haptic device is in the unidirectional mode. Thus, the tradeoffs of the two factors can be considered in the design of a haptic device.

Figure 13:
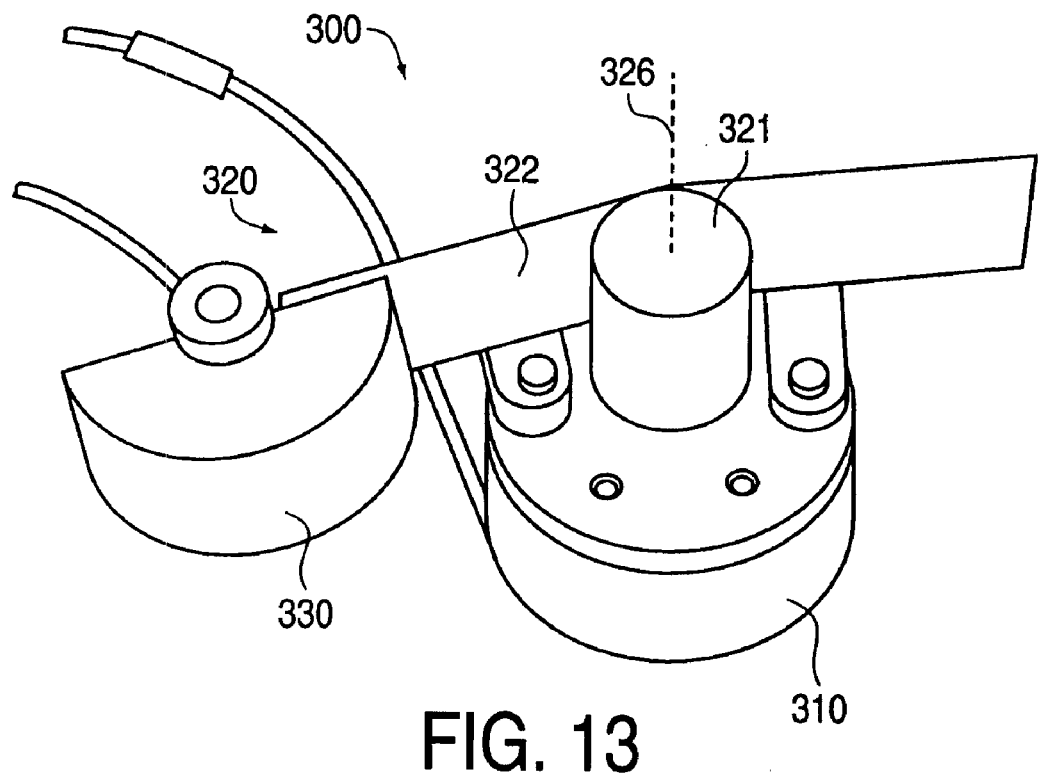
FIG. 13 shows a perspective view of a haptic device having a leaf spring, according to an embodiment of the invention.

FIG. 13 shows a perspective view of a haptic device having a leaf spring, according to an embodiment of the invention. As shown in FIG. 13, haptic device 300 includes actuator 310, elastic member 320 and mass 330. The actuator 310 includes a shaft (not shown) that rotates about axis 326. The elastic member 320 includes compliant portion 322 and proximate portion 321. The compliant portion 322 is a leaf spring made of, for example, metal having a thickness that allows flexibility.

Figure 14:
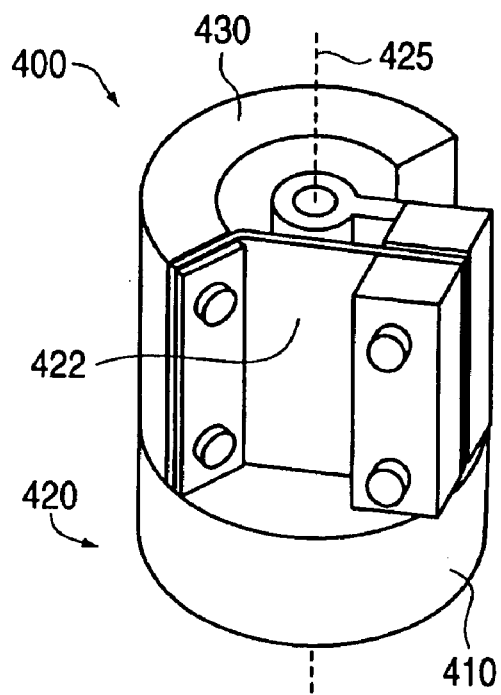
FIG. 14 shows a perspective view of a haptic device having a leaf spring, according to another embodiment of the invention.

FIG. 14 shows a perspective view of a haptic device having a leaf spring, according to another embodiment of the invention. As shown in FIG. 14, haptic device 400 includes actuator 410, elastic member 420 and mass 430. The actuator 410 includes a shaft (not shown) that rotates about axis 425. The elastic member 420 includes compliant portion 422 that is a leaf spring. Although similar to haptic device 300 shown in FIG. 13, haptic device 400 has a mass 430 larger in the dimension parallel to axis 425 and compliant portion 422 that is shorter in the radial direction orthogonal to axis 425.

Figure 15:
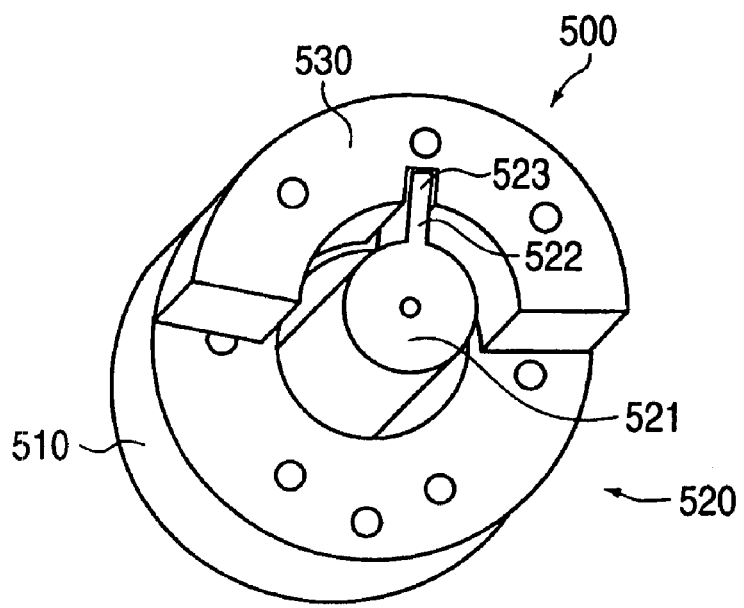
FIG. 15 shows a perspective view of a haptic device having a polypropylene elastic member, according to an embodiment of the invention.

FIG. 15 shows a perspective view of a haptic device having a polypropylene elastic member, according to an embodiment of the invention. As shown in FIG. 15, haptic device 500 includes actuator 510, elastic member 520 and mass 530. The elastic member 520 includes proximate portion 521, compliant portion 522 and distal portion 523. The elastic member 520 is made of polypropylene, although other materials of similar flexibility are possible. The distal portion 523 of elastic member 520 is coupled to mass 530 by a slit in mass 530.

Figure 16:
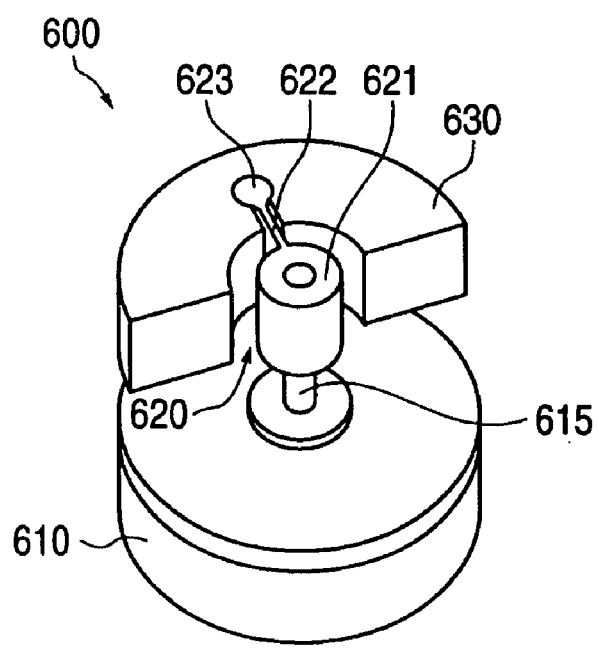
FIG. 16 shows a perspective view of a haptic device having a polypropylene elastic member, according to another embodiment of the invention.

FIG. 16 shows a perspective view of a haptic device having a polypropylene elastic member, according to another embodiment of the invention. In this embodiment, haptic device 600 includes actuator 610, elastic member 620 and mass 630. The elastic member 620 includes proximate portion 621, compliant portion 622 and distal portion 623. The elastic member 620 is made of polypropylene, although other materials of similar flexibility are possible. Distal portion 623 of elastic member 620 is coupled to mass 630 by a bore within mass 630. Distal portion 623 has a shape wider than compliant portion 622 thereby allowing distal portion 623 to fit snugly within the bore within mass 630.

Figure 17:
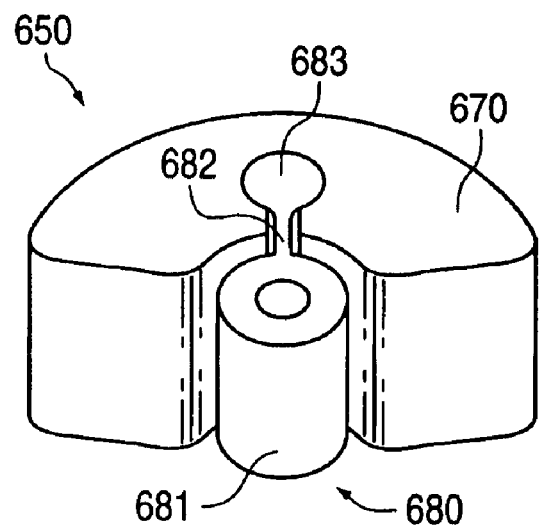
FIG. 17 shows a perspective view of a mass and elastic member for a haptic device, according to an embodiment of the invention.

FIG. 17 shows a perspective view of a mass and elastic member for a haptic device, according to an embodiment of the invention. In this embodiment, the shown portion of haptic device 650 includes elastic member 680 and mass 670. The elastic member 680 includes proximate portion 681, compliant portion 682 and distal portion 683. The distal portion 683 is fit snuggly within a bore within mass 670 where the bore and distal portion 683 are larger than that shown in FIG. 16.

Figure 18:
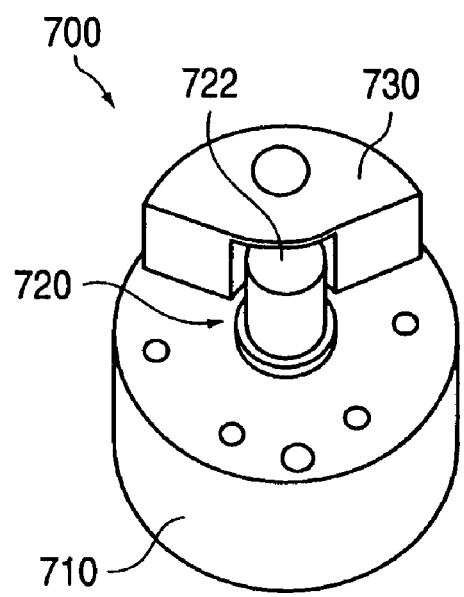
FIG. 18 shows a perspective view of a haptic device, according to another embodiment of the invention.

FIG. 18 shows a perspective view of a haptic device, according to another embodiment of the invention. In this embodiment, haptic device 700 includes actuator 710, elastic member 720 and mass 730. The elastic member 720 includes proximate portion (not shown), compliant portion (not shown) and distal portion 722. In this embodiment, mass 730 extends over the proximate portion and the compliant portion of the elastic member 720.

Although the above-described embodiments show an elastic member coupling the mass to the actuator, other configuration are possible for example where the actuator is coupled to a base by the elastic member. In such embodiments, the actuator is coupled to the mass without an intervening elastic member. As discussed below, FIGS. 21–26 show examples of embodiments of a haptic device having an elastic member coupling an actuator to a base.

Figure 19:
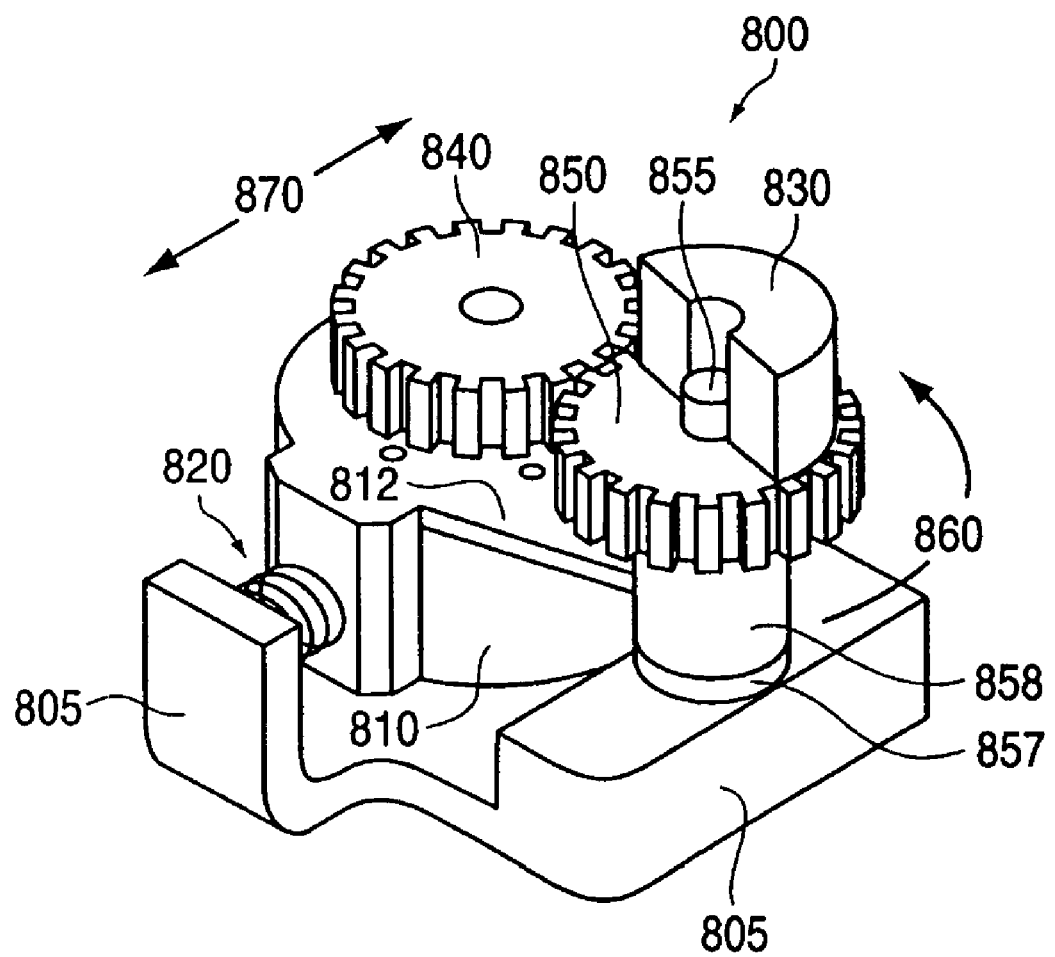
FIG. 19 shows a perspective view of a haptic device having an elastic member coupling an actuator to a base, according to another embodiment of the invention.

FIG. 19 shows a perspective view of a haptic device having an elastic member coupling an actuator to a base, according to another embodiment of the invention. In this embodiment, haptic device 800 includes a base 805, actuator 810, elastic element 820, mass 830, gear 840 and gear 850. In this embodiment, actuator 810 is elastically coupled to base 805 by elastic element 820. Actuator 810 is coupled to gear 840, which mates with gear 850. In addition, actuator 810 includes arm 812, which is coupled to sleeve 858 that surrounds shaft 855. Gear 850 rotates about shaft 855, which is grounded to base 805 by bushing 857. Mass 830 is rigidly coupled to gear 850 and rotates eccentrically about shaft 855.

When operating in the unidirectional mode, actuator 810 spins gears 840 and 850, which in turn rotate mass 830 about shaft 855 in direction 860. Actuator 810 can be driven by, for example, a DC signal. Such a DC signal can include, for example, modulation to provide controllability and bandwidth enhancement as described in U.S. application Ser. Nos. 09/669,029 and 09/908,184; the disclosures of which are both incorporated herein by reference.

When operating in the harmonic mode, actuator 810 moves with respect to base 805 within a range of frequencies associated with the harmonic mode. More specifically, actuator 810 can be driven with an AC drive signal (e.g., a signal having alternatively polarities). In response to this AC drive signal, actuator 810 undergoes a rapid reversal of torque. This rapid reversal of torque combined with the rotational inertia of mass 830 about shaft 855 causes actuator 810 to push against elastic member 820 and housing 805, to which actuator 810 is elastically coupled. This motion of actuator 810 moves with respect to bushing 857. This results in harmonic motion of actuator 810 in direction 870.

Figure 20:
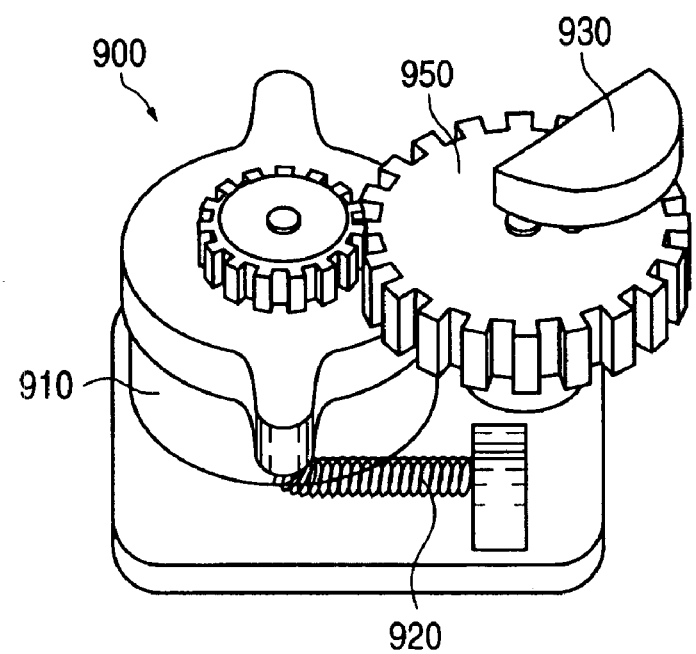
FIGS. 20 and 21 show perspective views of a haptic device having an elastic member coupling an actuator to a base, according to another embodiment of the invention.
Figure 21:
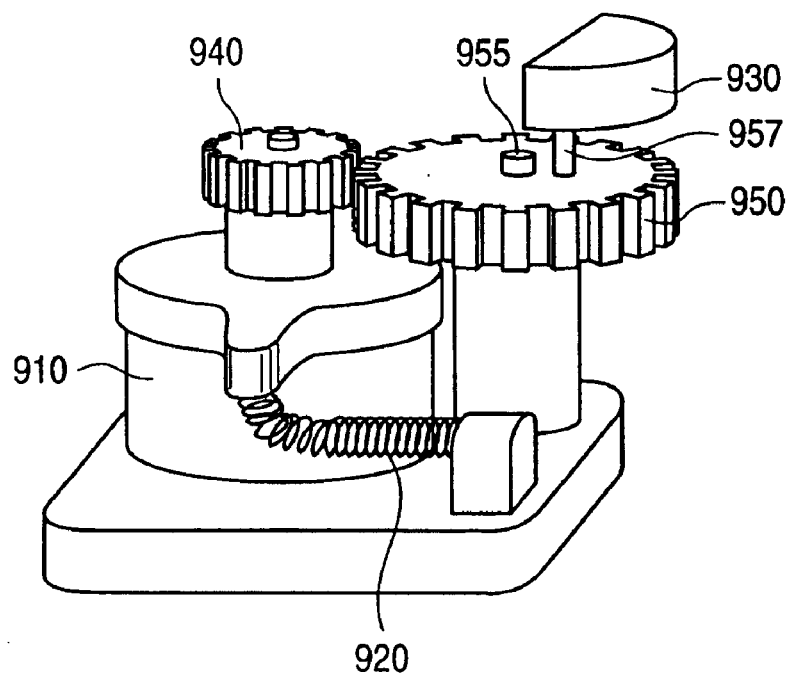

FIGS. 20 and 21 show perspective views of a haptic device having an elastic member coupling an actuator to a base, according to another embodiment of the invention. As shown in FIGS. 20 and 21, haptic device 900 includes a base 905, actuator 910, elastic element 920, mass 930, gear 940 and gear 950. In this embodiment, actuator 910 is elastically coupled to bass 905 by elastic element 920. Actuator 910 is coupled to gear 940, which mates with gear 950. Gear 950 rotates about shaft 955, which is grounded to base 905. Mass 930 is rigidly coupled to shaft 957, which is rotationally coupled to gear 950. Consequently, mass 930 rotates eccentrically about shaft 957.

Figure 22:
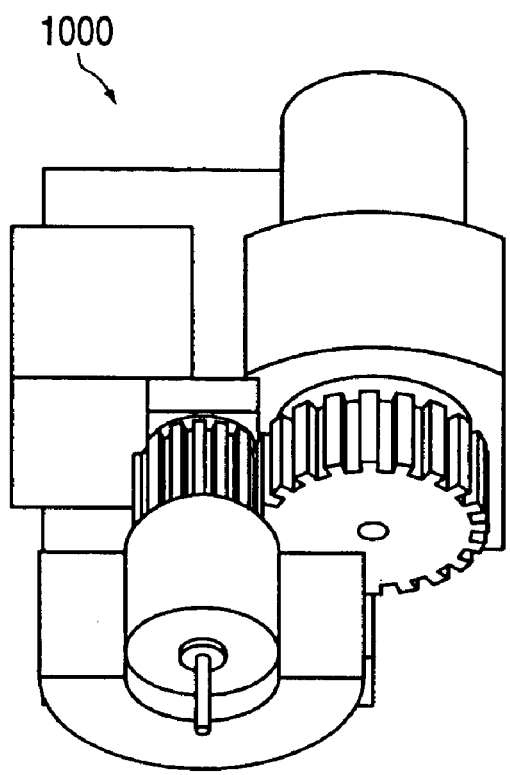
FIGS. 22 and 23 show perspective views of a haptic device having an elastic member coupling an actuator to a base, according to yet another embodiment of the invention.
Figure 23:
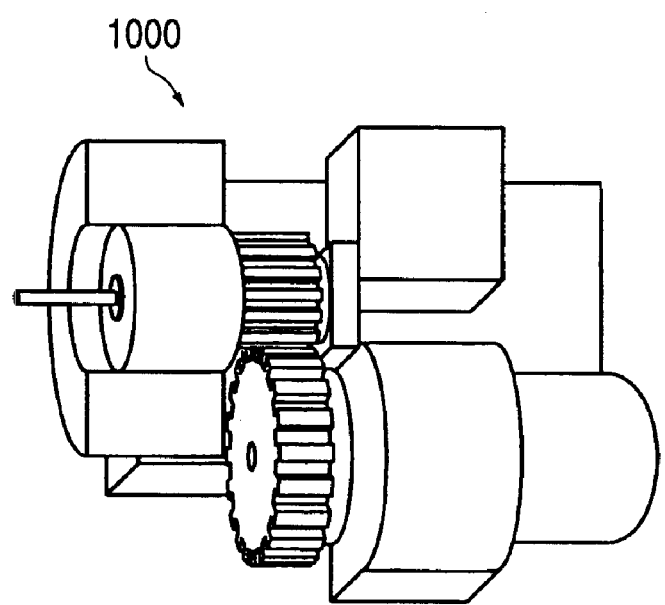

FIGS. 22 and 23 show perspective views of a haptic device having an elastic member coupling an actuator to a base, according to yet another embodiment of the invention. Although similar to the embodiment shown in FIGS. 20 and 21, which has rotational axes perpendicular to the base, haptic device 1000 has its rotational axes parallel to the base. This arrangement allows haptic device 1000 to fit within a smaller vertical space.

In some embodiments, the haptic device can include two actuators that share a common rotation axis and a common mass. Such embodiments allow, for example, the switch to and from the unidirectional mode and the harmonic mode based entirely on electrical signals. In other words, in such embodiments, a mechanical escapement or other form of actuation is not needed to switch to and from the unidirectional mode and the harmonic mode. Examples of such embodiments are discussed below in reference to FIGS. 24–26.

Figure 24:
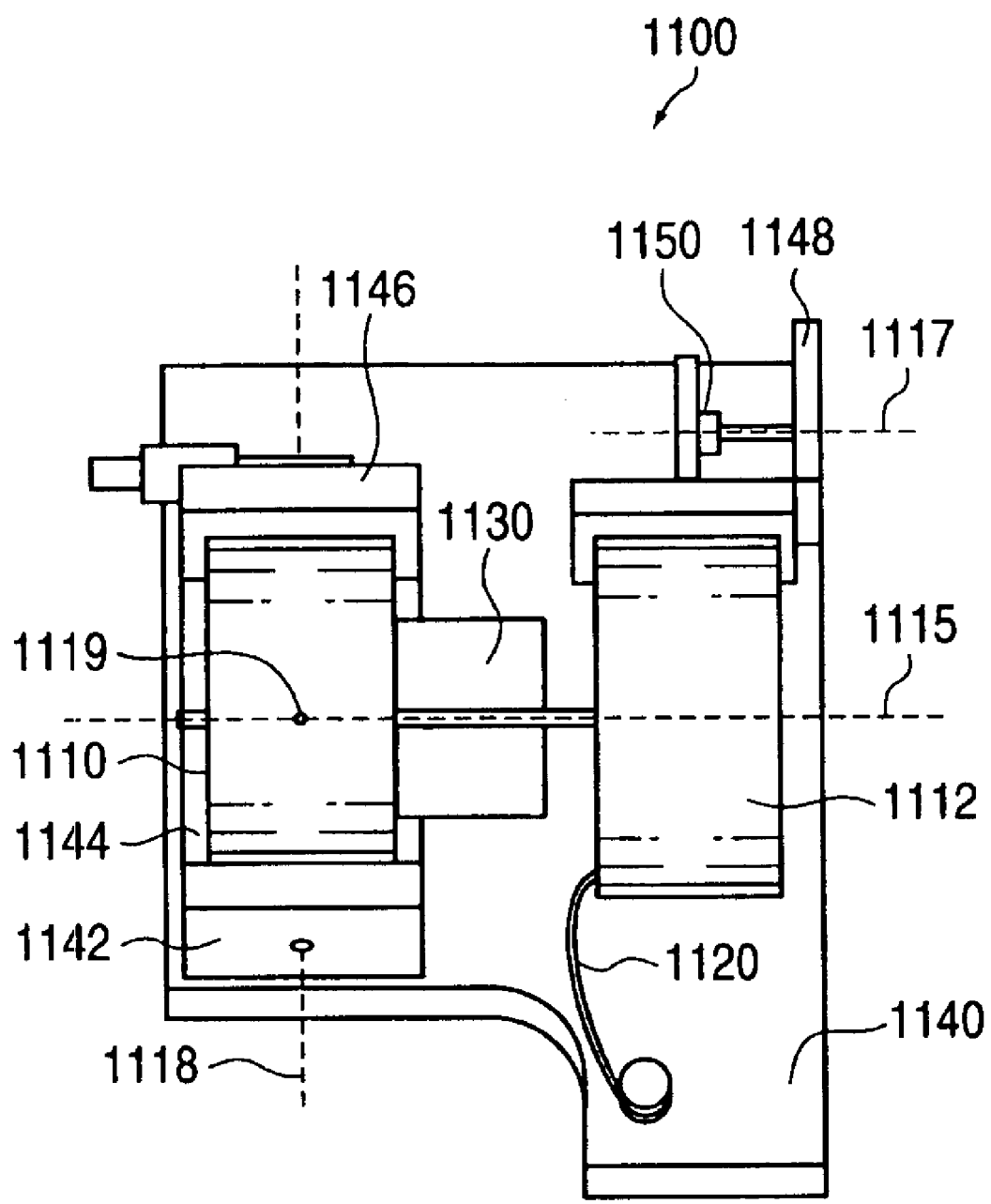
FIG. 24 shows a perspective view of a haptic device having two actuators that share a common rotation axis and a common mass, according to an embodiment of the invention.

FIG. 24 shows a perspective view of a haptic device having two actuators that share a common rotation axis and a common mass, according to an embodiment of the invention. As shown in FIG. 24, haptic device 1100 includes base 1140, actuators 1110 and 1112, mass 1130 and elastic member 1120. Actuators 1110 and 1112 share a common rotation axis 1115, along which mass 1130 is eccentrically coupled.

Base 1140 includes base portions 1142, 1144 and 1146, which collectively form a cradle-like structure that supports actuator 1110 along a pivot axis 1118. Pivot axis 1118 is substantially perpendicular to rotation axis 1115. Actuator 1110 can pivot about pivot axis 1118 within the cradle-like structure formed by base portions 1142, 1144 and 1146. Actuator 1112 is pivotally coupled to base portion 1148 of base 1140 along pivot axis 1117, which is offset from rotation axis 1115. Actuator 1112 is also suspended by elastic member 1120.

Similar to the devices described above, haptic device 1100 can operate in a unidirectional mode, a harmonic mode or a superposition mode. When operating in the unidirectional mode, actuator 1110 and actuator 1112 are driven, for example, by in-phase signals. This can allow the mass to be rotated at a higher frequency than can be achieved by a single actuator, and thereby a higher amplitude force can be achieved for a given mass. This can cause mass 1130 to rotate strongly with double the force otherwise typical of a haptic device with a single actuator.

When operating in the harmonic mode, actuator 1110 and actuator 1112 are driven by signals that are, for example, 180° out of phase from each other. In this harmonic mode, actuator 1110 reacts to the torque produced by actuator 1112 by imparting a vertical force to actuator 1112 about the offset pivot axis 1117 at pivot joint location 1150. Consequently, actuator 1112 and mass 1130 move harmonically about an axis defined by the pivot joint location 1150 and point 1119, which is the intersection of axis 1115 and axis 1117.

Haptic device 1100 can be combined with a dual H-bridge amplifier (not shown) that drives actuators 1110 and 1112. In alternative embodiments where the doubling of force while in the unidirectional mode is not desired, the motor windings of the actuators can be modified for more efficient arrangement. Other adjustments can be made to achieve a desired haptic output. For example, the elastic member can be tuned, the location of the pivot joint can be adjusted, or the connection between the two actuators can be adjusted. In addition, a blended drive scheme can be used that evens out the resonances of the system. The actuators can be controlled by, for example, a microprocessor controller to select an operational mode. Alternatively, two PWM channels can be provided with their own direction bits.

Figure 25:
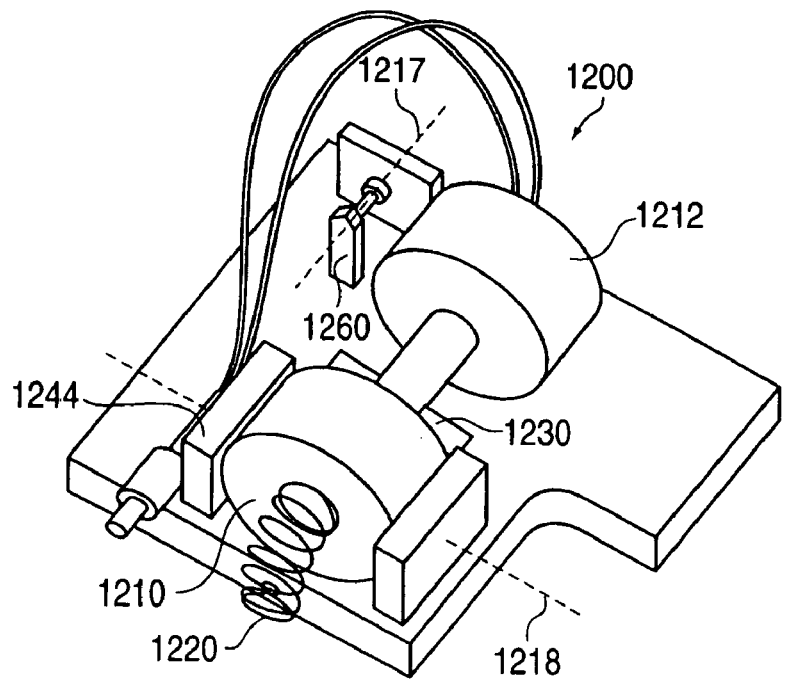
FIGS. 25 and 26 show perspective views of a haptic device having two actuators that share a common rotation axis and a common mass, according to another embodiment of the invention.
Figure 26:
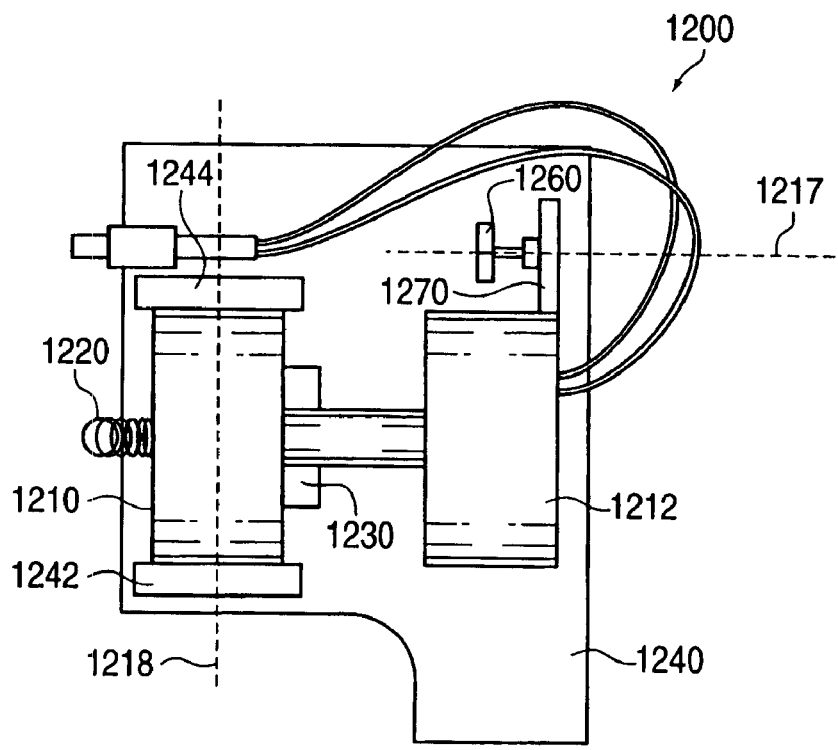

FIGS. 25 and 26 show perspective views of a haptic device having two actuators that share a common rotation axis and a common mass, according to another embodiment of the invention. Haptic device 1200 includes base 1240, actuators 1210 and 1212, mass 1230, elastic member 1220 and joint 1260. Actuators 1210 and 1212 share a common rotation axis, along which mass 1230 is eccentrically coupled. Base 1240 includes base portions 1242 and 1244, which collectively form a cradle-like structure that supports actuator 1210 along a pivot axis 1218. Actuator 1212 is also grounded to housing 1240 by elastic member 1220, which is for example a helical spring. Actuator 1212 is pivotally coupled to base 1240 along pivot axis 1217, which is offset from rotation axis and includes joint 1260 (e.g., a ball joint).

Haptic device 1200 operates similar to the haptic device described in reference to FIG. 17. In haptic device 1200, however, joint 1217 on pivot axis 1217 allows actuator 1212 movement in an additional directional as well as motion about axis about 1218.

Figure 27:
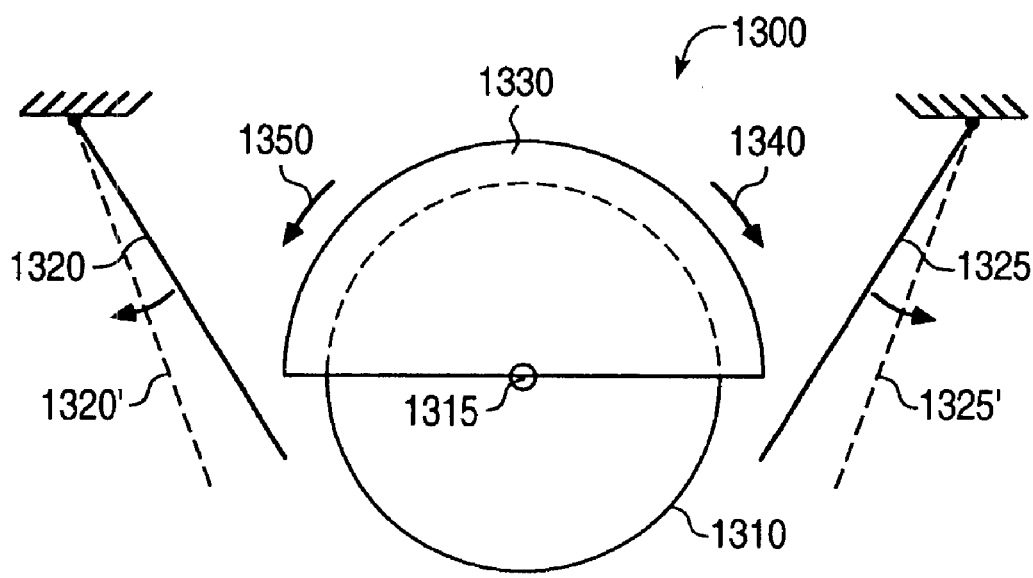
FIG. 27 shows a top view of a haptic device having limiting stops, according to another embodiment of the invention.

FIG. 27 shows a schematic top view of a haptic device having limiting stops, according to another embodiment of the invention. As shown in FIG. 27, haptic device 1300 includes actuator 1310, mass 1330, and elastic members 1320 and 1325. Mass 1330 is rigidly coupled to a shaft 1315 of actuator 1310. Elastic members 1320 and 1325 each have one end grounded. Elastic member 1320 is disposed within one side of a path of mass 1330, and elastic member 1325 is disposed within another side of the path of mass 1330. Elastic members 1320 and 1325 act as limiting stops in the harmonic mode, which can be overcome in the unidirectional mode.

In the harmonic mode, actuator 1310 is driven with an AC drive signal to produce a bidirectional motion of mass 1330. When mass 1330 rotates sufficiently in one direction, for example direction 1350, mass 1330 engages elastic member 1320 causing it to flex for example to position 1320'. The flexed elastic member 1320 stores energy so that when the polarity of the AC drive signal is reversed, mass 1330 is moved in the opposite direction 1340 and the flexed elastic member 1320 releases the stored energy. Similar to elastic member 1320, when mass 1330 rotates sufficiently in the other direction, for example direction 1340, mass 1330 engages elastic member 1320 causing it to flex for example to position 1325', and the same process is repeated. The interaction of mass 1330 with elastic members 1320 and 1325 contributes to the harmonic motion of haptic device when operating in the harmonic mode.

In the unidirectional mode, actuator 1310 can be driven with a DC drive signal having an amplitude sufficient to move mass 1330 beyond elastic members 1320 and 1330.

Mass 1330 can then freely rotate in the same direction continuously. To switch from the unidirectional mode to the harmonic mode, the amplitude of the DC drive signal can be reduced and the AC drive signal provided. The amplitude of the DC drive signal can be reduced to the point that the torque on mass 1330 is reduced so that mass 1330 is deflected by elastic members 1320 and 1325. In alternative embodiments, the haptic device can include a rotational sensor, which can sense the position of the rotating mass. This rotational sensor can indicate when the mass is deflected by the elastic members; at this point, the amplitude of the drive signal can be maintained and an AC drive signal can be provided.

Figure 28:
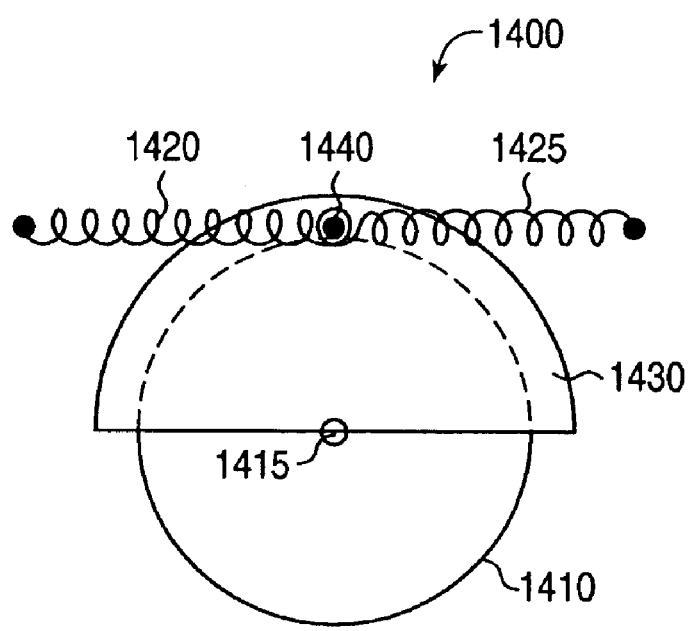
FIG. 28 shows a top view of a haptic device having limiting stops, according to another embodiment.

Although the elastic members 1320 and 1325 are shown as leaf springs, other types of elastic members are possible. For example, FIG. 28 shows a top view of a haptic device having limiting stops, according to another embodiment of the invention. As shown in FIG. 28, haptic device 1400 includes actuator 1410, mass 1430, and elastic members 1420 and 1425. Mass 1430 is rigidly coupled to a shaft 1415 of actuator 1410. Elastic members 1420 and 1425 each have one end grounded and the other end rotatably coupled to mass 1430 at pin 1440. In this embodiment, elastic members 1420 and 1425 are helical tension springs. Elastic members 1420 and 1425 act as limiting stops in the harmonic mode, which can be overcome in the unidirectional mode.

In the harmonic mode, actuator 1410 is driven with an AC drive signal to produce a bidirectional motion of mass 1430. When mass 1430 rotates sufficiently in one direction, elastic member 1420 causes it to slow down and move in an opposite direction. In the unidirectional mode, actuator 1410 can be driven with a DC drive signal having an amplitude sufficient to stretch elastic members 1420 and 1425 so that mass 1430 moves in a complete circle and freely rotates in the same direction continuously.

In alternative embodiments, the elastic members can be magnets. For example, the actuator can include internal magnets to bias the rotor of the actuator to a desired "cogging" position. This arrangement provides a spring-return force on the rotor while in the harmonic mode. For another example, the actuator can include external magnets rather than internal magnets.

Figure 29:
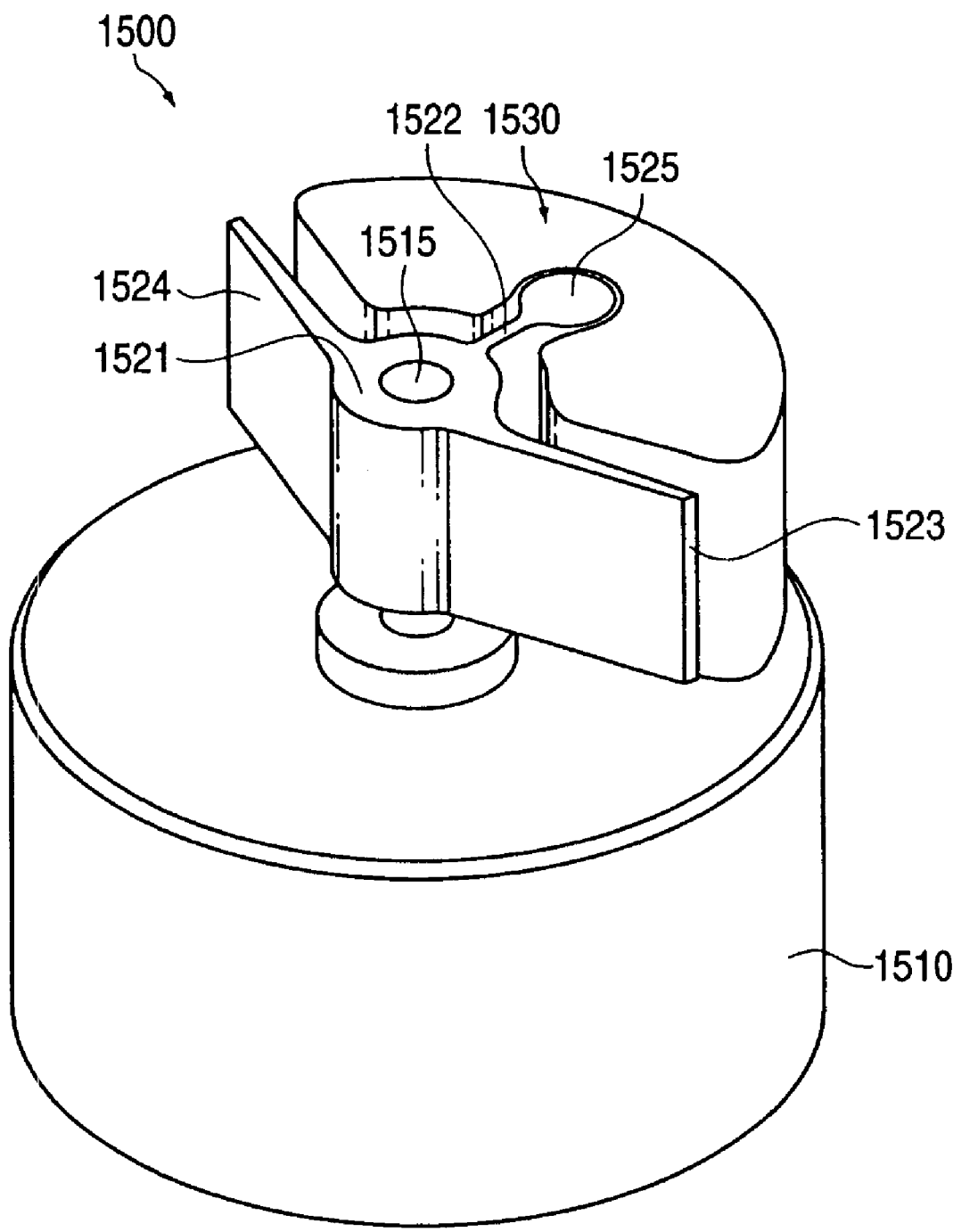
FIGS. 29 and 30 show a perspective view of a haptic device having stops integrally formed with an elastic member according to an embodiment of invention.
Figure 30:
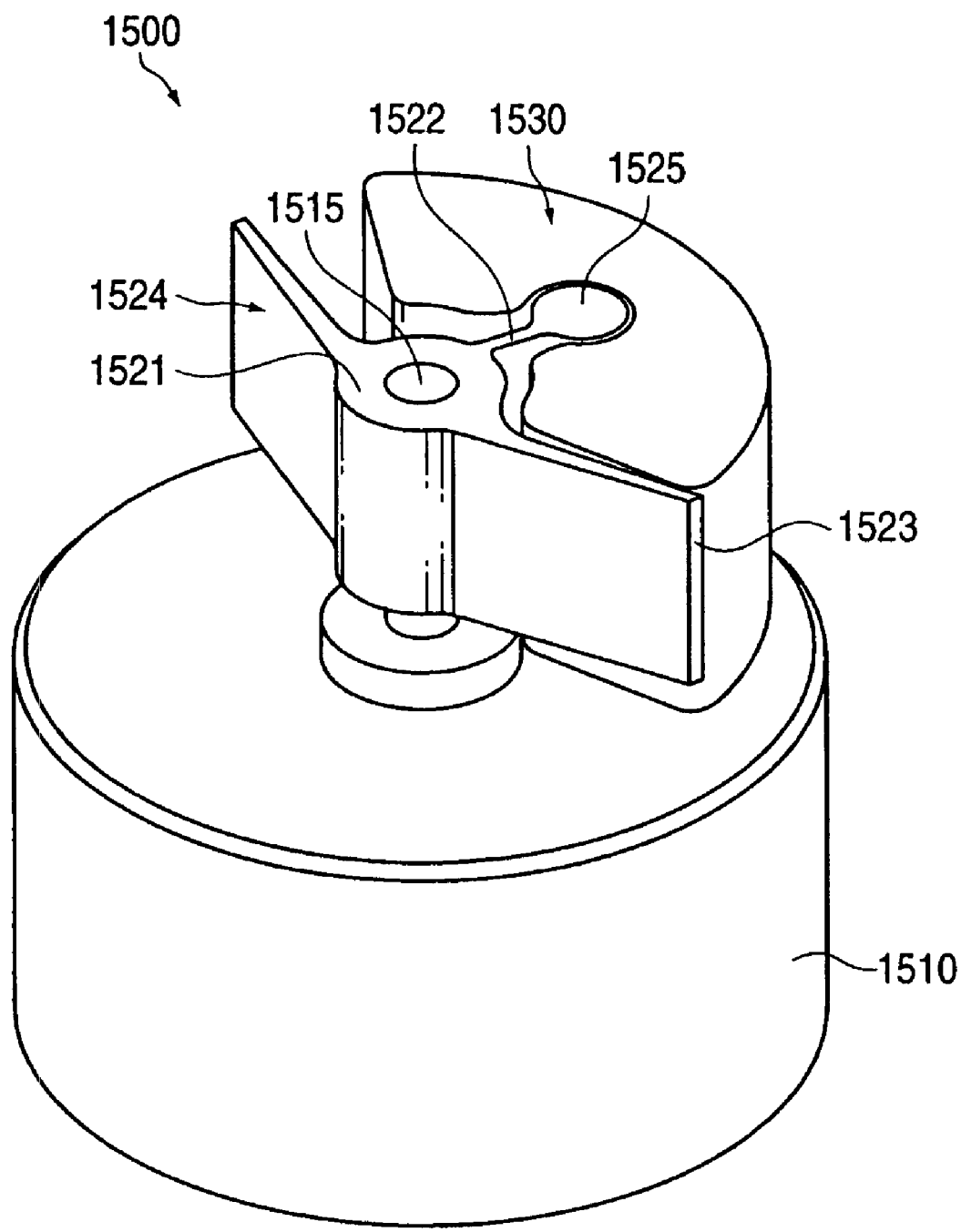

Although the limiting stops shown in FIGS. 27 and 28 are coupled to ground, alternative embodiments are possible where the limiting stops are not coupled to ground. For example, FIGS. 29 and 30 show a perspective view of a haptic device having stops integrally formed with an elastic member, according to an embodiment of invention. As shown in FIGS. 29 and 30, haptic device 1500 includes actuator 1510, an elastic member 1520 and mass 1530. Elastic member 1520 includes a proximate portion 1521, a compliant portion 1522 and a distal portion 1525. Proximate portion 1521 of elastic member 1520 is coupled to the shaft 1515 of actuator 1510. Distal portion 1525, which has a width greater than the compliant portion 1522, is coupled to mass 1530. Stops 1524 and 1523 are integrally formed with elastic member 1520.

Stops 1524 and 1523 act as limiting stops while haptic device 1500 is operating in the harmonic mode. In the harmonic mode, actuator 1510 is driven with an AC drive signal to produce a bidirectional motion of mass 1530. When mass 1530 rotates sufficiently in one direction, for example towards stop 1523, mass 1530 engages stop 1523 causing it to flex (see, for example, FIG. 30). Stop 1523 stores energy so that when the polarity of the AC drive signal is reversed, mass 1530 is moved in the opposite direction and stop 1523 releases the stored energy. Stop 1524 similarly engages mass 1530 on the opposite side of elastic member 1520.

Stops 1524 and 1523 each have a tapered shape that is thinner at the distal end and wider at the end proximate to shaft 1515, from the perspective of a top view. In other words, from a top view, stops 1524 and 1523 each have an angular dimension that is greater near shaft 1515 than at the distal end. This tapered shape allows stops 1524 and 1523 to act progressively stiffer (i.e., to flex less) as mass 1530 engages stops 1524 and 1523 with a greater force. As a result, as the haptic device 1500 nears resonance, stops 1524 and 1523 are engaged by mass 1530 and the effective resonance shifts from what the resonance would otherwise be without the stops. Said another way, stops 1524 and 1523 change the effective elasticity of elastic member 1520 thereby changing the harmonic frequency of haptic device 1500.

In addition, stops 1524 and 1523 prevent over-travel of mass 1530 while it is moving during operation. Moreover, stops 1524 and 1523 reduce noise associated with mass 1530 contacting any nearby surfaces that could otherwise occur without the presence of stops 1524 and 1523.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference preferred embodiments thereof, it will be understood by those skilled in the art that various changes in form and details may be made therein without departing from the spirit and scope of the invention. For example, although various components such as the elastic members can be described above as having unitary or integral construction, these components could be constructed from non-unitary construction.

What is claimed is:

1. A haptic device comprising:
   an actuator having a shaft; and
   a mass coupled to the shaft of the actuator,
   the actuator being elastically coupled to at least one of the mass and a base,
   the actuator and the mass having a first operational mode associated with a range of frequencies and a second operational mode associated with a range of frequencies different from the range of frequencies associated with the first operational mode, the range of frequencies associated with the second operational mode including a harmonic frequency associated with the elastic coupling of the actuator to at least one of the mass and a base,
   the actuator and the mass collectively having a third operational mode that includes a superposition of the first operational mode and the second operational mode.

2. A haptic device comprising:
   a rotary actuator having a shaft;
   an elastic element coupled to the shaft of the rotary actuator; and
   a mass coupled to the elastic element,
   the rotary actuator, the elastic element and the mass collectively having a first operational mode associated with a range of frequencies and a second operational mode associated with a range of frequencies different from the range of frequencies associated with the first operational mode, the second operational mode being associated with a harmonic frequency of the elastic element, and the rotary actuator, the elastic element and the mass collectively has a third operational mode associated with a superposition of the range of frequencies of the first operational mode and the range of frequencies of the second operational mode.

3. The haptic device of claim 2, wherein:

the actuator is configured to receive a signal, the actuator is configured to rotate the shaft based on the signal so that the rotary actuator, the elastic element and the mass collectively operate in one of the first operational mode, the second operational mode and the third operational mode.

4. A haptic device comprising:

a rotary actuator having a shaft;

an elastic member coupled to the shaft of the rotary actuator;

a mass coupled to the elastic element;

a first stop coupled to the rotary actuator at a location of the rotary actuator; and a second stop coupled to the rotary actuator at a location of the rotary actuator different from the location at which the first stop is coupled to the rotary actuator, the elastic member being coupled to the rotary actuator between the location at which the first stop is coupled to the rotary actuator and the location at which the second stop is coupled to the rotary actuator, wherein the rotary actuator, the elastic element and the mass collectively have a first operational mode associated with its own range of frequencies and a second operational mode associated with its own range of frequencies different from the range of frequencies associated with the first operational mode, the second operational mode being associated with a range of effective harmonic frequencies defined, at least in pair, by a shape of the first stop and a shape of the second stop.

5. A haptic device comprising:

means for receiving a signal having at least one of a first frequency component and a second frequency component; and means for rotating a mass, the means for rotating the mass configured to respond to the means for receiving in a first operational mode and a second operational mode, the first operational mode being associated with the first frequency component, the second operational mode being associated with the second frequency component, the first operational mode of the means for rotating being associated with a first range of frequencies, the second operational mode of the means for rotating being associated with a second range of frequencies, the first range of frequencies associated with the first operational mode of the means for rotating being different than the second range of frequencies associated with the second operational mode of the means for rotating, the means for rotating including an elastic member associated with a harmonic frequency, the second range of frequencies associated with the second operational mode of the means for rotating including the harmonic frequency, the harmonic frequency being greater than a frequency from the first range of frequencies associated with the first operational mode of the means for rotating.

6. The haptic device of claim 5, wherein:

the means for rotating includes a first stop, a second stop and an elastic member, the range of frequencies associated with the second operational mode of the means for rotating including a frequency greater than a frequency from the range of frequencies associated with the first operational mode of the means for rotating, and the range of frequencies associated with the second operational mode of the means for rotating including the harmonic frequency is a range of effective harmonic frequencies defined, at least in part, by a shape of the first stop and a shape of the second stop.

* * * * *